(12) United States Patent
Park et al.

(10) Patent No.: US 10,621,555 B2
(45) Date of Patent: Apr. 14, 2020

(54) SCHEDULE MANAGEMENT METHOD AND ELECTRONIC DEVICE ADAPTED TO THE SAME

(71) Applicant: Samsung Electronics Co., Ltd., Gyeonggi-do (KR)

(72) Inventors: Hyosun Park, Suwon-si (KR); Jeongsik Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 15/652,060

(22) Filed: Jul. 17, 2017

(65) Prior Publication Data

US 2018/0025326 A1    Jan. 25, 2018

(30) Foreign Application Priority Data

Jul. 19, 2016   (KR) .................. 10-2016-0091447

(51) Int. Cl.
| | | |
|---|---|---|
| G06Q 10/10 | (2012.01) | |
| H04M 1/725 | (2006.01) | |
| G08B 21/24 | (2006.01) | |
| G06F 3/0482 | (2013.01) | |

(52) U.S. Cl.
CPC ......... *G06Q 10/1095* (2013.01); *G08B 21/24* (2013.01); *H04M 1/72552* (2013.01); *H04M 1/72566* (2013.01); *G06F 3/0482* (2013.01)

(58) Field of Classification Search
CPC .......... G06Q 10/00–50/00; H04M 1/00–19/00
USPC ............................................... 705/7.11–7.42
See application file for complete search history.

(56) References Cited

U.S. PATENT DOCUMENTS

| | | | | |
|---|---|---|---|---|
| 5,278,750 A | * | 1/1994 | Kaneko | G06Q 10/06 705/7.12 |
| 6,369,840 B1 | * | 4/2002 | Barnett | G06Q 10/06314 715/853 |
| 6,678,613 B2 | * | 1/2004 | Andrews | G01C 21/20 342/357.75 |
| 7,020,594 B1 | * | 3/2006 | Chacon | G06Q 10/04 700/100 |
| 7,251,786 B2 | * | 7/2007 | Wynn | G06F 17/241 715/255 |

(Continued)

FOREIGN PATENT DOCUMENTS

| | | |
|---|---|---|
| KR | 10-2014-0046359 A | 4/2014 |
| KR | 20160021736 A | 2/2016 |

OTHER PUBLICATIONS

European Patent Office, "Supplementary European Search Report," Application No. EP17831200.5, dated Feb. 14, 2019, 7 pages.

(Continued)

*Primary Examiner* — Alan S Miller

(57) ABSTRACT

A schedule management method for an electronic device is disclosed. The method includes: storing a schedule of events to be performed within a set time period; displaying an alarm screen including a user interface (UI) regarding the progress of the schedule and a UI regarding the adjustment of the schedule before the schedule starts; and performing associated work according to the progress of the schedule if the UI regarding the progress of the schedule is selected, or performing associated work according to the adjustment of the schedule if the UI regarding the adjustment of the schedule is selected.

18 Claims, 23 Drawing Sheets

(56) References Cited

U.S. PATENT DOCUMENTS

| | | | | |
|---|---|---|---|---|
| 7,283,970 B2* | 10/2007 | Cragun | | G06Q 10/109 |
| | | | | 705/7.19 |
| 7,370,282 B2* | 5/2008 | Cary | | G06Q 10/109 |
| | | | | 715/772 |
| 7,757,181 B2* | 7/2010 | Pan | | G06Q 10/109 |
| | | | | 715/764 |
| 7,836,400 B2* | 11/2010 | May | | G06Q 10/109 |
| | | | | 345/501 |
| 7,869,941 B2* | 1/2011 | Coughlin | | G01C 21/20 |
| | | | | 701/533 |
| 7,991,637 B1* | 8/2011 | Guiheneuf | | G06Q 10/109 |
| | | | | 705/7.18 |
| 8,073,614 B2* | 12/2011 | Coughlin | | G01C 21/20 |
| | | | | 701/465 |
| 8,112,299 B2* | 2/2012 | Kim | | G01C 21/362 |
| | | | | 705/7.18 |
| 8,423,288 B2* | 4/2013 | Stahl | | G01C 21/362 |
| | | | | 701/411 |
| 8,682,704 B2* | 3/2014 | Nease, Jr. | | G06Q 50/22 |
| | | | | 705/7.18 |
| 8,838,146 B2* | 9/2014 | Yoon, II | | G06Q 10/06 |
| | | | | 455/456.3 |
| 8,838,373 B2* | 9/2014 | Chen | | G06Q 10/109 |
| | | | | 701/400 |
| 8,943,407 B2* | 1/2015 | May | | G06Q 10/109 |
| | | | | 709/206 |
| 9,207,084 B2* | 12/2015 | Stahl | | G01C 21/362 |
| 9,239,719 B1* | 1/2016 | Feinstein | | G06Q 10/00 |
| 9,243,911 B2* | 1/2016 | Coughlin | | G01O 21/20 |
| 9,245,025 B2 | 1/2016 | Chen | | |
| 9,317,825 B2* | 4/2016 | Defusco | | G06Q 10/06313 |
| 9,479,633 B2* | 10/2016 | Caine | | G04G 13/02 |
| 9,760,870 B2* | 9/2017 | Norton | | G06Q 10/02 |
| 2003/0060979 A1* | 3/2003 | Andrews | | G01C 21/20 |
| | | | | 701/408 |
| 2003/0177190 A1* | 9/2003 | Moody | | G06Q 10/107 |
| | | | | 709/206 |
| 2004/0044557 A1* | 3/2004 | Frech | | G06Q 10/06 |
| | | | | 434/219 |
| 2004/0078256 A1* | 4/2004 | Glitho | | G06Q 10/109 |
| | | | | 709/207 |
| 2005/0222971 A1* | 10/2005 | Cary | | G06Q 10/109 |
| 2007/0250369 A1 | 10/2007 | Hwang et al. | | |
| 2008/0016444 A1 | 1/2008 | Choi | | |
| 2008/0167937 A1* | 7/2008 | Coughlin | | G01C 21/20 |
| | | | | 705/7.16 |
| 2008/0281665 A1* | 11/2008 | Opaluch | | G06Q 10/02 |
| | | | | 705/5 |
| 2010/0030612 A1* | 2/2010 | Kim | | G01C 21/362 |
| | | | | 705/7.18 |
| 2010/0099462 A1 | 4/2010 | Baek et al. | | |
| 2010/0269049 A1* | 10/2010 | Fearon | | G06Q 10/109 |
| | | | | 715/744 |
| 2010/0304792 A1* | 12/2010 | Li | | H04B 1/3877 |
| | | | | 455/566 |
| 2010/0312831 A1* | 12/2010 | Xie | | G06Q 10/109 |
| | | | | 709/204 |
| 2011/0029870 A1* | 2/2011 | May | | G06Q 10/109 |
| | | | | 715/710 |
| 2011/0077860 A1* | 3/2011 | Coughlin | | G01C 21/20 |
| | | | | 701/465 |
| 2011/0098061 A1* | 4/2011 | Yoon, II | | G06Q 10/06 |
| | | | | 455/456.3 |
| 2011/0098078 A1* | 4/2011 | Kim | | G06Q 10/109 |
| | | | | 455/550.1 |
| 2011/0130958 A1* | 6/2011 | Stahl | | G01C 21/362 |
| | | | | 701/533 |
| 2011/0184772 A1* | 7/2011 | Norton | | G06Q 10/02 |
| | | | | 705/7.18 |
| 2012/0066629 A1* | 3/2012 | Lee | | G06F 3/04847 |
| | | | | 715/769 |
| 2012/0239451 A1* | 9/2012 | Caligor | | G06Q 10/00 |
| | | | | 705/7.21 |
| 2013/0007694 A1* | 1/2013 | Knapp | | G06Q 10/10 |
| | | | | 717/103 |
| 2013/0024452 A1* | 1/2013 | Defusco | | G06Q 10/06313 |
| | | | | 707/737 |
| 2013/0038437 A1* | 2/2013 | Talati | | B60K 35/00 |
| | | | | 340/438 |
| 2013/0219309 A1* | 8/2013 | Jang | | G06F 3/0482 |
| | | | | 715/764 |
| 2014/0114571 A1* | 4/2014 | Coughlin | | G01O 21/20 |
| | | | | 701/526 |
| 2015/0358414 A1* | 12/2015 | Mehta | | G06F 3/0484 |
| | | | | 705/5 |
| 2016/0026978 A1 | 1/2016 | Li et al. | | |
| 2016/0140473 A1* | 5/2016 | Hodes | | G06Q 10/1097 |
| | | | | 705/7.21 |
| 2016/0378549 A1* | 12/2016 | Irish | | H04L 67/1002 |
| | | | | 718/107 |
| 2018/0025327 A1* | 1/2018 | Runstedler | | G06Q 10/1097 |
| | | | | 705/7.16 |
| 2018/0053127 A1* | 2/2018 | Boileau | | G06Q 10/0631 |
| 2018/0158300 A1* | 6/2018 | Laska | | H04N 7/18 |
| 2018/0365628 A1* | 12/2018 | Bhaskaran | | G06Q 10/06311 |

OTHER PUBLICATIONS

ISA/KR, "International Search Report," Application No. PCT/KR2017/004962, dated Aug. 25, 2017, 3 pages.

* cited by examiner

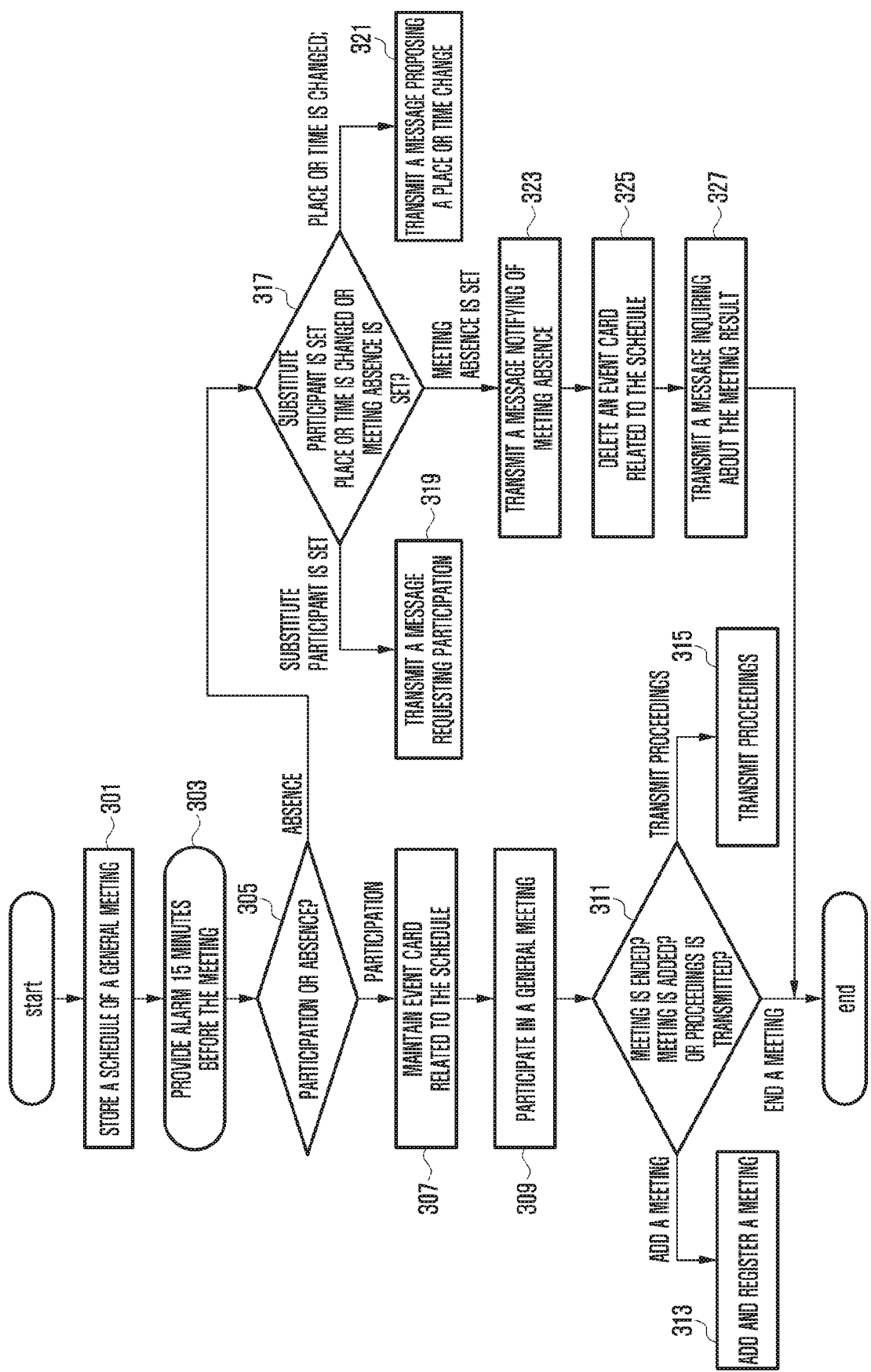

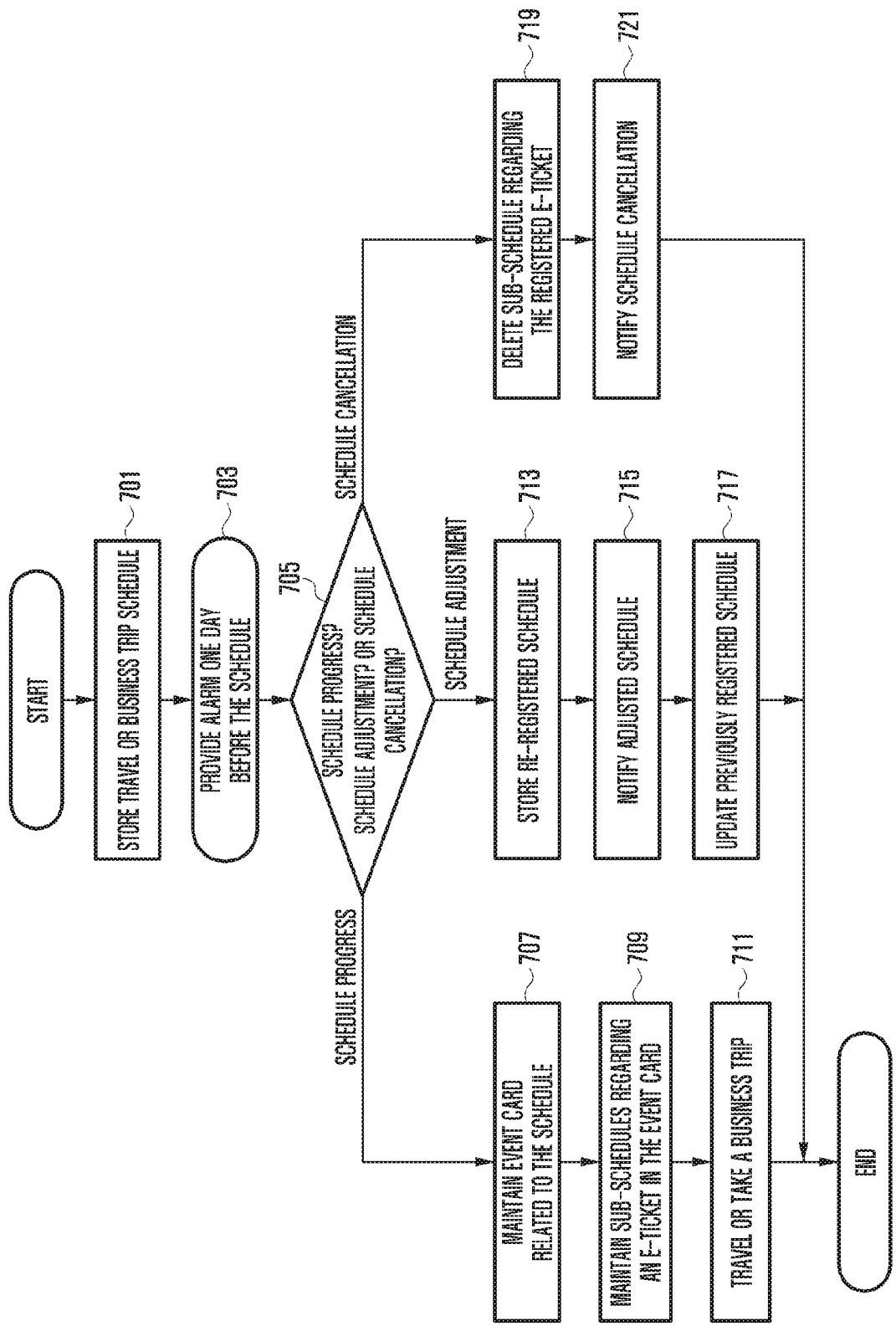

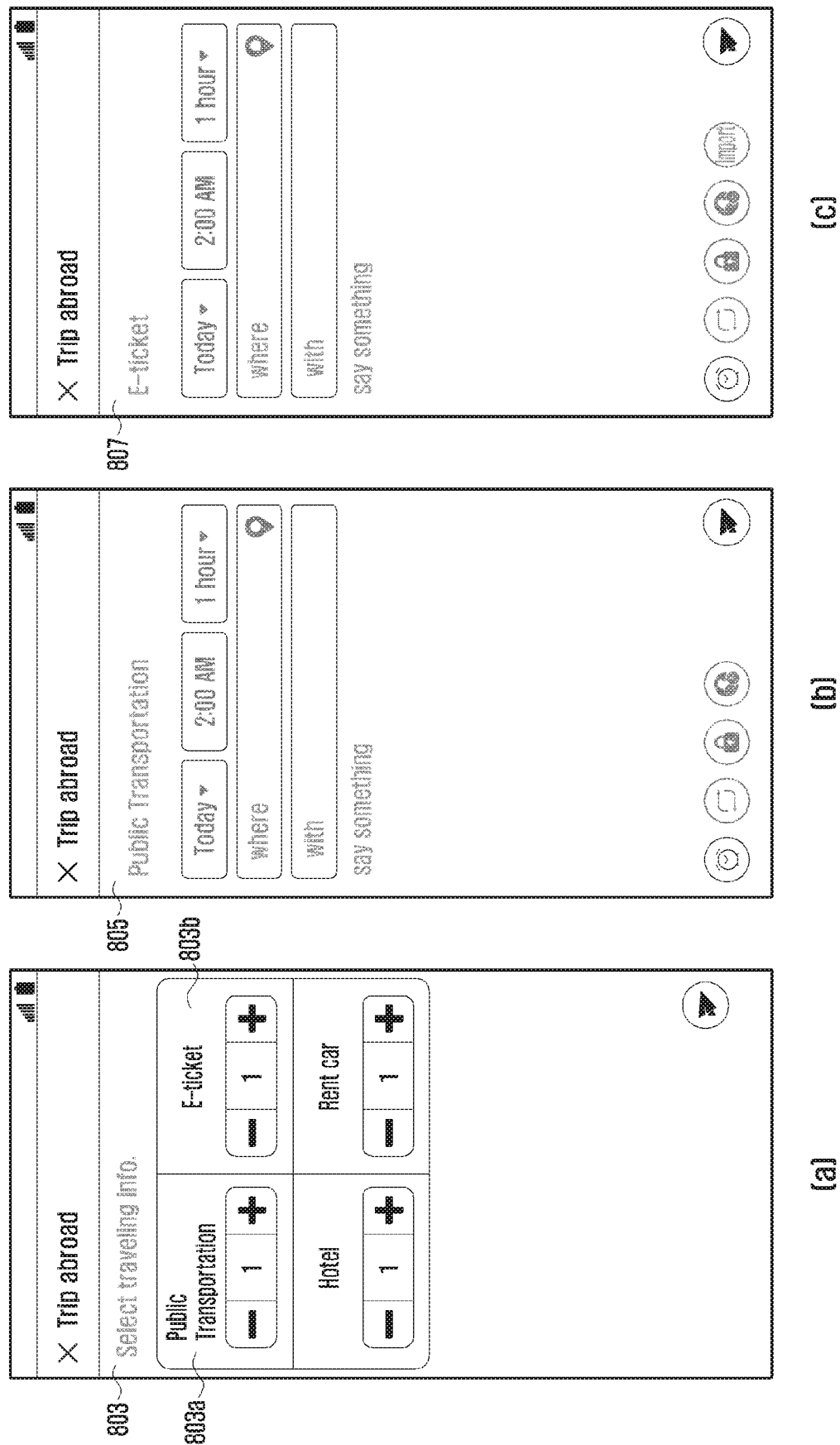

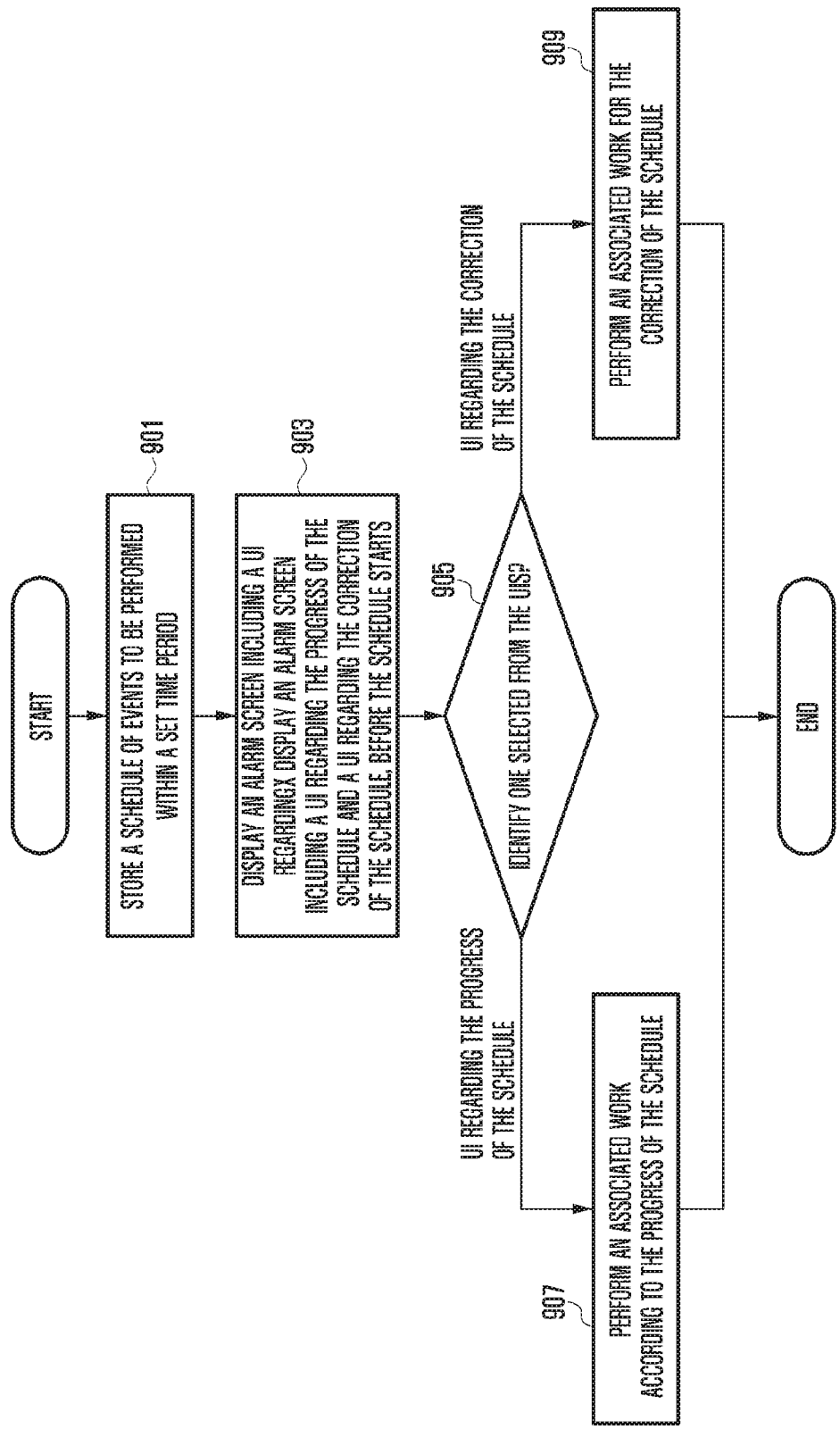

FIG. 11B

Related

Attachment 15

[Agile] Focus_GUI_WQHD_v0.41_151116 PPTX

[Focus] Feature list for phase 2 (draft)_ 151116 XLS

PNG

Email 20

Meeting Reservation System   10:32 AM
[Alarm meeting] Focus ideation meeting
Hello Ashley, I am sorry for your waiting. I ha...

JH.CHE   ! 10:32 AM
[Urgent] Checklist for new concept
Hello Ashley, I am sorry for your waiting. I ha...

Meeting Reservation System   10:32 AM
[Canceled] Focus ideation meeting
Hello Ashley, I am sorry for your waiting. I ha...

Task 10

Prepare seminar
Due 3 days ago

SCHEDULE MANAGEMENT METHOD AND ELECTRONIC DEVICE ADAPTED TO THE SAME

CROSS-REFERENCE TO RELATED APPLICATION AND CLAIM OF PRIORITY

The present application is related to and claims priority from and the benefit under 35 U.S.C. § 119(a) of Korean Patent Application No. 10-2016-0091447 filed on Jul. 19, 2016, which is hereby incorporated by reference for all purposes as if fully set forth herein.

TECHNICAL FIELD

The present disclosure relates to a method and apparatus for managing schedules registered by a user.

BACKGROUND

In recent years, with the development of digital technology, various types of electronic devices allowing users to process user's personal information while they are moving have been released. Examples of an electronic device are a mobile communication terminal, a Personal Digital Assistant (PDA), an electronic organizer, a smartphone, a tablet Personal Computer (tablet PC), etc.

Users can manage their schedules using electronic devices. For example, if an electronic device runs a calendar application thereon, the user may register his/her schedules by dates in the electronic device, via the schedule management screen provided in the calendar application.

The schedules registered by the user may be managed via electronic devices. For example, a user may change or delete registered schedules using the electronic device, and the electronic device may provide an alarm service to notify the user with an alarm that a registered schedule is starting.

SUMMARY

If a user has registered a schedule and then registers schedules related to the registered schedule, existing schedule management systems require the user to perform as if the user registers a new schedule for the schedules every time.

If a user registers a schedule, existing electronic devices have provided a uniform user interface regardless of types of schedule.

To address the above-discussed deficiencies, it is an object to provide a function and a user interface for allowing a user to easily perform an associated work related to a schedule.

In accordance with an aspect of the invention, a schedule management method of an electronic device is provided. The schedule management method includes: storing a schedule of events to be performed within a set time period; displaying an alarm screen including a user interface (UI) regarding the progress of the schedule and a UI regarding the adjustment of the schedule; and performing an associated work according to the progress of the schedule if the UI regarding the progress of the schedule is selected or an associated work according to the adjustment of the schedule if the UI regarding the adjustment of the schedule is selected.

In accordance with another aspect of the invention, an electronic device is provided. The electronic device includes: a memory for storing a schedule of works to be performed within a set time period; a display for displaying an alarm screen including a user interface (UI) regarding the progress of the schedule and a UI regarding the adjustment of the schedule; a user input unit for receiving a user input selecting the UI regarding the progress of the schedule or the UI regarding the adjustment of the schedule; and a processor electrically connected to the memory, the display and the user input unit. The processor performs an associated work according to the progress of the schedule if the UI regarding the progress of the schedule is selected; or an associated work according to the adjustment of the schedule if the UI regarding the adjustment of the schedule is selected.

In accordance with another aspect of the invention, a computer-readable recording medium is provided. The medium store program instructions for enabling an electronic device to execute the following processes: storing a schedule of events to be performed within a set time period; displaying an alarm screen including a user interface (UI) regarding the progress of the schedule and a UI regarding the adjustment of the schedule; and performing an associated work according to the progress of the schedule if the UI regarding the progress of the schedule is selected or an associated work according to the adjustment of the schedule if the UI regarding the adjustment of the schedule is selected.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or", is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a flowchart that describes a method of managing schedules according to various embodiments of the present disclosure;

FIG. 7 is a flowchart that describes a method of managing schedules according to various embodiments of the present disclosure;

FIGS. 8A and 8B show screens when a schedule is managed according to various embodiments of the present disclosure;

FIG. 9 is a flowchart that describes a method of managing schedules according to various embodiments of the present disclosure;

FIGS. 11A to 11D are a diagram showing an event card according to various embodiments of the present invention.

DETAILED DESCRIPTION

Figure 1A:
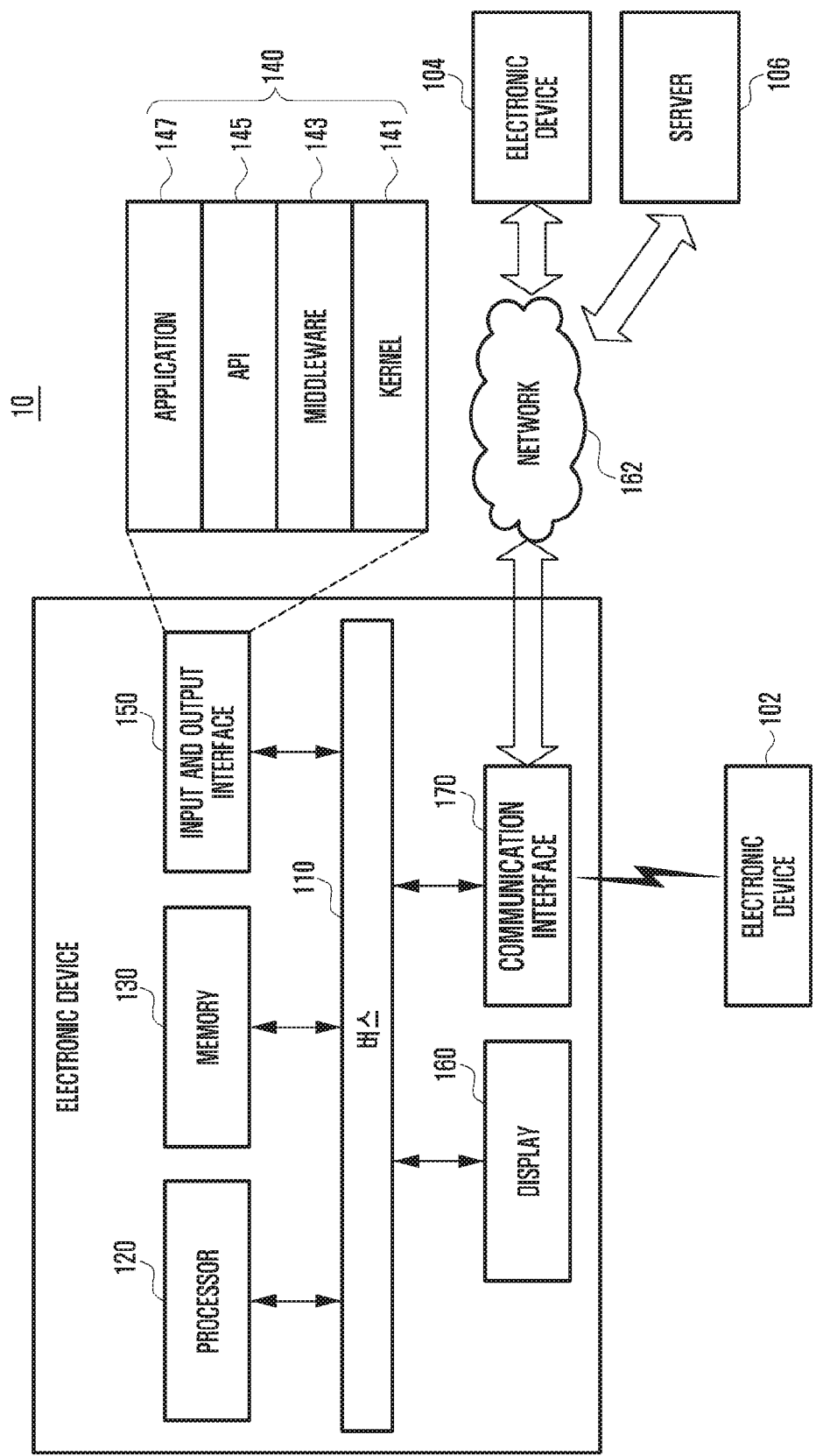
FIG. 1A shows electronic devices in a network environment including an electronic device according to various embodiments of the present disclosure.

FIGS. 1A through 12C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description is made with reference to the accompanying drawings, and is provided to assist in a comprehensive understanding of various example embodiments of the present disclosure as defined by the claims and their equivalents. It includes various details to assist in that understanding but these are to be regarded merely as examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in the present disclosure denote the presence of the disclosed functions, operations, and elements and do not limit one or more additional functions, operations, and elements. In an example embodiment of the present disclosure, the terms, such as "include" and/or "have" may be construed to denote a certain characteristic, number, operation, element, component or a combination thereof but may not be construed to exclude the existence of or a possibility of addition of one or more other characteristics, numbers, operations, elements, components or combinations thereof.

Furthermore, in the present disclosure, the expression "and/or" includes any and all combinations of the associated listed words. For example, the expression "A and/or B" may include A, may include B, or may include both A and B.

In an example embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe various example embodiments of the present disclosure, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device may correspond to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital versatile disc DVD) player, an audio device, various medical devices (for example, magnetic resonance angiography (MRA), magnetic resonance imaging (MRI), computed tomography (CT), a scanning machine, an ultrasonic wave device, and the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a bead-mounted display (HMD), a flat panel display device, an electronic frame, an electronic album, furniture or a portion of a building/structure that includes a communication function, an electronic board, an electronic signature receiving device, a projector, or the like, but is not limited thereto. It will be apparent to those skilled in the art that the electronic device according to the present disclosure is not limited to the aforementioned devices.

FIG. 1A is a block diagram illustrating an example configuration of an electronic device in a network environment according to an example embodiment of the present disclosure.

Referring to FIG. 1A, an electronic device 100 may include a bus 110, a processor (e.g., including processing circuitry) 120, a memory 130, an input/output (I/O) interface (e.g., including input/output circuitry) 150, a display 160, a communication interface (e.g., including communication circuitry) 170, and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the I/O interface 150, the display 160, the communication interface 170, and the like) through the bus 110, may interpret the received commands, and may execute calculation or data processing according to the interpreted commands.

The memory 130 may store commands or data received from the processor 120 or other elements (e.g., the I/O interface 150, the display 160, the communication interface 170, and the like) or generated by the processor 120 or the other elements. The memory 130 may include programming modules 140, including, for example, a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 100 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from one or more applications 140 and/or the middleware 143, for example, the middleware 143 may perform load balancing of the work requests by using a method of assigning a priority, in which system resources (e.g., the bus 110, the processor 120, the memory 130, and the like) of the electronic device 100 are allocated, to at least one of the one or more applications 140.

The API 145 is an interface through which the application 147 is capable of controlling a function provided by the kernel 141 or the middleware 143, and may include, for example, at least one interface or function for file control, window control, image processing, character control, and the like.

The I/O interface 150 may include various input/output circuitry and, for example, may receive a command or data as input from a user, and may deliver the received command or data to the processor 120 or the memory 130 through the bus 110. The display 160 may display a video, an image, data, and the like, to the user.

The communication interface 170 may include various communication circuitry and may connect communication between another electronic device 102 and the electronic device 100. The communication module 170 may support a short-range communication protocol 164 Wi-Fi, Bluetooth (BT), and near field communication (NFC)), or a network 162 (e.g., the Internet, a local area network (LAN), a wide area network (WAN), a telecommunication network, a cellular network, a satellite network, a plain old telephone service (POTS), and the like). Each of the electronic devices 102 and 104 may be identical (e.g., of an identical type) to or different (e.g., of a different type) from the electronic device 100. Further, the communication module 170 may connect communication between a server 106 and the electronic device 100 via the network 162.

Figure 1B:
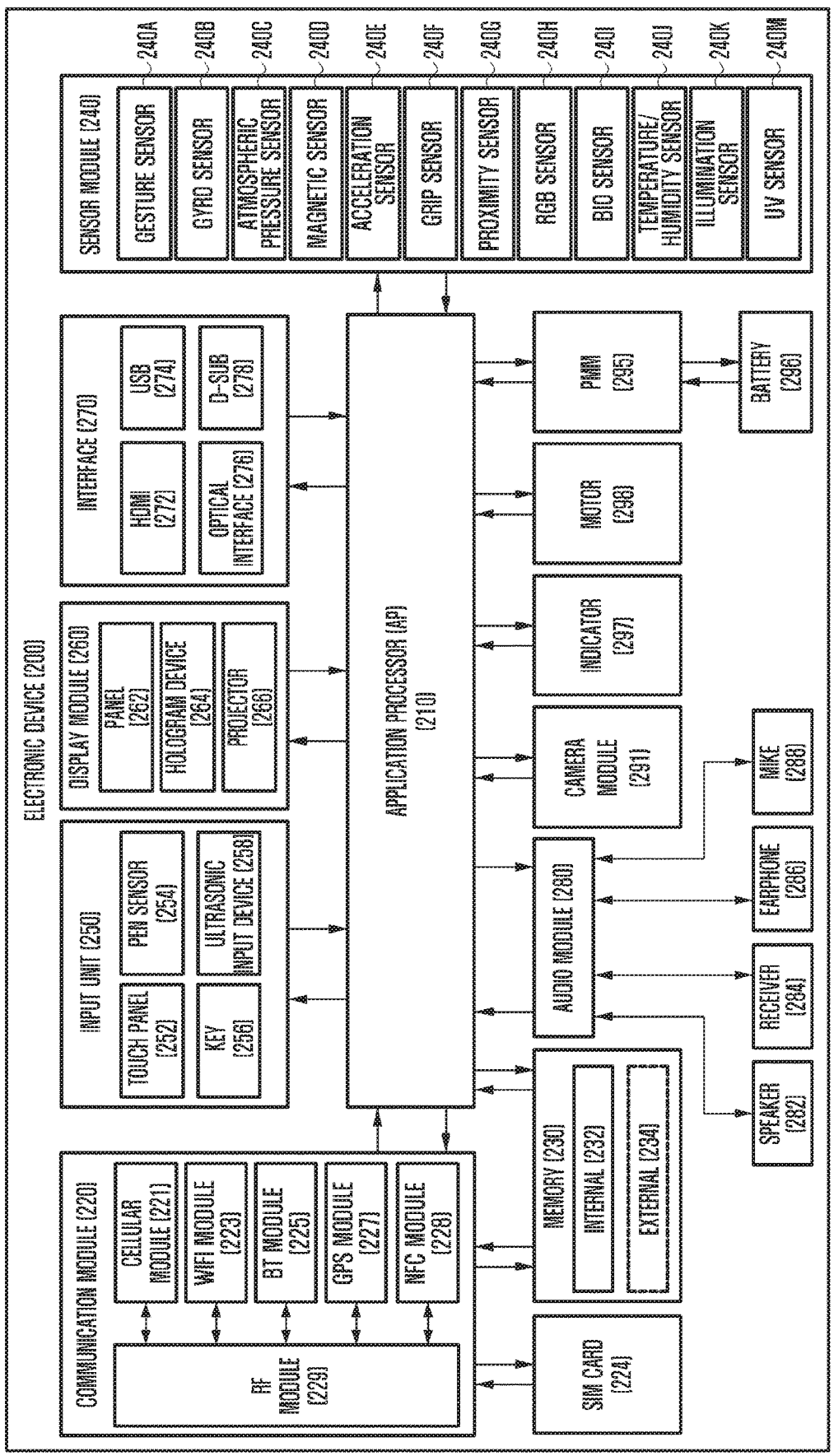
FIG. 1B is a block diagram of an electronic device according to various embodiments of the present disclosure.

FIG. 1B is a block diagram illustrating an example configuration of an electronic device according to an example embodiment of the present disclosure.

Referring to FIG. 1B, an electronic device 201 may be, for example, the electronic device 100 illustrated in FIG. 1.

The electronic device 201 may include one or more processors (e.g., including processing circuitry) 210, a subscriber identification module (SIM) card 224, a memory 230, a communication module (e.g., including communication circuitry) 220, a sensor module 240, an input unit (e.g., including input circuitry) 250, a display module 260, an interface (e.g., including interface circuitry) 270, an audio module 280, a camera module 291, a power management module 295, a battery 296, an indicator 297, a motor 298 and any other similar and/or suitable components.

The processor 210 (e.g., the processor 120) may include various processing circuitry, such as, for example, and without limitation, one or more application processors (APs), or one or more communication processors (CPs). The processor 210 may be, for example, the processor 120 illustrated in FIG. 1. The AP and the CP are illustrated as being included in the processor 210 in FIG. 1B, but may be included in different integrated circuit (IC) packages, respectively. According to an embodiment of the present disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present disclosure, the processor 210 may further include a graphics processing unit (GPU) (not illustrated).

The CP may manage a data line and may convert a communication protocol in the case of communication between the electronic device (e.g., the electronic device 100) including the electronic device 201 and different electronic devices connected to the electronic device through the network. The CP may be implemented by, for example, an SoC. According to an example embodiment of the present disclosure, the CP may perform at least some of multimedia control functions. The CP, for example, may distinguish and authenticate a terminal in a communication network by using a SIM (e.g., the SIM card 224). In addition, the CP may provide the user with services, such as a voice telephony call, a video telephony call, a text message, packet data, and the like.

Further, the CP may control the transmission and reception of data by the communication module 220. In FIG. 1B, the elements, such as the CP, the power management module 295, the memory 230, and the like are illustrated as elements separate from the AP. However, according to an example embodiment of the present disclosure, the AP may include at least some (e.g., the CP) of the above-described elements.

According to an example embodiment of the present disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM card 224 may be inserted into a slot formed in a particular portion of the electronic device 100. The SIM card 224 may include unique identification information (e.g., integrated circuit card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., random access memory (RAM), a dynamic RAM (DRAM), a static RAM (SRAM), a synchronous dynamic RAM (SDRAM), and the like), and a non-volatile memory (e.g., a read only memory (ROM), a one-time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, and the like). According to an embodiment of the present disclosure, the internal memory 232 may be in the form of a solid state drive (SSD). The external memory 234 may further include a flash drive, for example, a compact flash (CF), a secure digital (SD), a micro-SD, a mini-SD, an extreme digital (xD), a memory stick, and the like.

The communication module 220 may include a communication module 220 including a radio frequency (RF) module 229. The communication module 220 may be, for example, the communication module 160 illustrated in FIG. 1A. The communication module 220 may include various communication circuitry, such as, for example, and without limitation, a Wi-Fi module 223, a BT module 225, a GPS module 227, and a NFC module 228. For example, the communication module 220 may provide a wireless communication function by using an RF. Additionally or alternatively, the communication module 220 may include a network interface (e.g., a LAN card), a modulator/demodulator (modem), and the like for connecting the electronic device 201 to a network (e.g., the Internet, a LAN, a WAN, a telecommunication network, a cellular network, a satellite network, a POTS, and the like).

The communication module 220 (e.g., the communication module 170) may perform data communication with other electronic devices (e.g., the electronic device 104 and the server 106) through a network. According to an example embodiment of the present disclosure, the communication module 220 may include various communication circuitry including, for example, and without limitation, a cellular module 221, a Wi-Fi module 223, a BT module 225, a GPS module 227, an NFC module 228, and an RF module 229.

The RF module 229 may be used for transmission and reception of data, for example, transmission and reception of RF signals or other electronic signals. Although not illustrated, the RF module 229 may include, for example, a transceiver, a power amplifier module (PAM), a frequency filter, a low noise amplifier (LNA), and the like. In addition, the RF module 229 may further include a component for transmitting and receiving electromagnetic waves in a free space in a wireless communication, for example, a conductor, a conductive wire, and the like.

The sensor module 240 may include various sensors, such as, for example, and without limitation, at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illumination sensor 240K, and an ultra violet (UV) sensor 240M. The sensor module 240 may measure a physical quantity or may detect an operating state of the electronic device 201, and may convert the measured or detected information into an electrical signal. Additionally/alternatively, the sensor module 240 may include, for example, an Electronic nose (E-nose) sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. The sensor module 240 may further include a control circuit (not illustrated) for controlling one or more sensors included therein.

The input unit 250 may include various input circuitry, such as, for example, and without limitation, a touch panel 252, a pen sensor 254 (e.g., a digital pen sensor), keys 256, and an ultrasonic input device 258. The input unit 250 may be, for example, the I/O module 150 illustrated in FIG. 1A. The touch panel 252 may recognize a touch input in at least one of for example, a capacitive scheme, a resistive scheme, an infrared scheme, and an acoustic wave scheme. In addition, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input device 258 enables the terminal to detect a sound wave by using a microphone (e.g., a microphone 288) of the terminal through a pen generating an ultrasonic signal, and to identify data. The ultrasonic input device 258 is capable of wireless recognition. According to an example embodiment of the present disclosure, the electronic device 201 may receive a user input from an external device (e.g., a network, a computer, or a server), which is connected to the communication module 220, through the communication module 220.

The display module 260 may include a panel 262, a hologram 264, and a projector 266. The display module 260 may be, for example, the display module 160 illustrated in FIG. 1A. The panel 262 may be, for example, a liquid crystal display (LCD) and an active matrix organic light emitting diode (AM-OLED) display, or the like, but is not limited thereto. The panel 262 may be implemented so as to be, for example, flexible, transparent, or wearable. The panel 262 may include the touch panel 252. The hologram 264 may display a three-dimensional image in the air by using interference of light. The projector 266 is configured to project images onto a surface. According to an embodiment of the present disclosure, the display module 260 may further include a control circuit for controlling the panel 262, the hologram 264, and the projectors 266.

The interface 270 may include various interface circuitry, such as, for example, and without limitation, a high-definition multimedia interface (HDMI) 272, a universal serial bus (USB) 274, an optical interface 276, and a d-subminiature (D-sub) 278. Additionally or alternatively, the interface 270 may include, for example, SD/multi-media card (MMC) (not illustrated) or infrared data association (IrDA) (not illustrated).

An audio module 280 may bidirectionally convert between a voice and an electrical signal. The audio module 280 may convert voice information, which is input to or output from the audio module 280, through, for example, a speaker 282, a receiver 284, an earphone 286, the microphone 288, and the like.

The camera module 291 may capture an image and a moving image. According to an embodiment of the present disclosure, the camera module 291 may include one or more image sensors (e.g., a front lens or a back lens), an image signal processor (ISP) (not illustrated), and a flash LED (not illustrated).

The power management module 295 may manage power of the electronic device 201. Although not illustrated, the power management module 295 may include, for example, a power management IC (PMIC), a charger IC, or a battery fuel gauge.

The PMIC may be mounted to, for example, an IC or an SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, and the like) for wireless charging may be added to perform the wireless charging.

The battery fuel gauge may measure, for example, a residual quantity of the battery 296, or a voltage, a current, and a temperature during the charging. The battery 296 may supply power by generating electricity, and may be, for example, a rechargeable battery.

The indicator 297 may indicate particular states of the electronic device 201 or a part (e.g., the AP) of the electronic device 201, for example, a booting state, a message state, a charging state and the like. The motor 298 may convert an electrical signal into a mechanical vibration. The processor 210 may control the sensor module 240.

Although not illustrated, the electronic device 201 may include a processing unit (e.g., a GPU) for supporting a mobile TV. The processing unit for supporting a mobile TV may process media data according to standards, such as, for example, digital multimedia broadcasting (DMB), digital video broadcasting (DVB), media flow, and the like. Each of the above-described elements of the electronic device 201 according to an embodiment of the present disclosure may include one or more components, and the name of the relevant element may change depending on the type of electronic device. The electronic device 201 according to an embodiment of the present disclosure may include at least one of the above-described elements. Some of the above-described elements may be omitted from the electronic device 201, or the electronic device 201 may further include additional elements. In addition, some of the elements of the electronic device 201 according to an embodiment of the present disclosure may be combined into one entity, which may perform functions identical to those of the relevant elements before the combination.

The term "module" used in the present disclosure may refer to, for example, a unit including one or more combinations of hardware, software, and/or firmware. The "module" may be interchangeable with a term, such as "unit," "logic," "logical block," "component," "circuit," and the like. The "module" may be a minimum unit of a component formed as one body or a part thereof. The "module" may be a minimum unit for performing one or more functions or a past thereof. The "module" may be implemented mechanically or electronically. For example, the "module" according to an example embodiment of the present disclosure may include at least one of a dedicated processor, a CPU, an application-specific integrated circuit (ASIC) chip, a field-programmable gate array (FPGA), and a programmable-logic device for performing certain operations which have been known or are to be developed in the future.

Figure 1C:
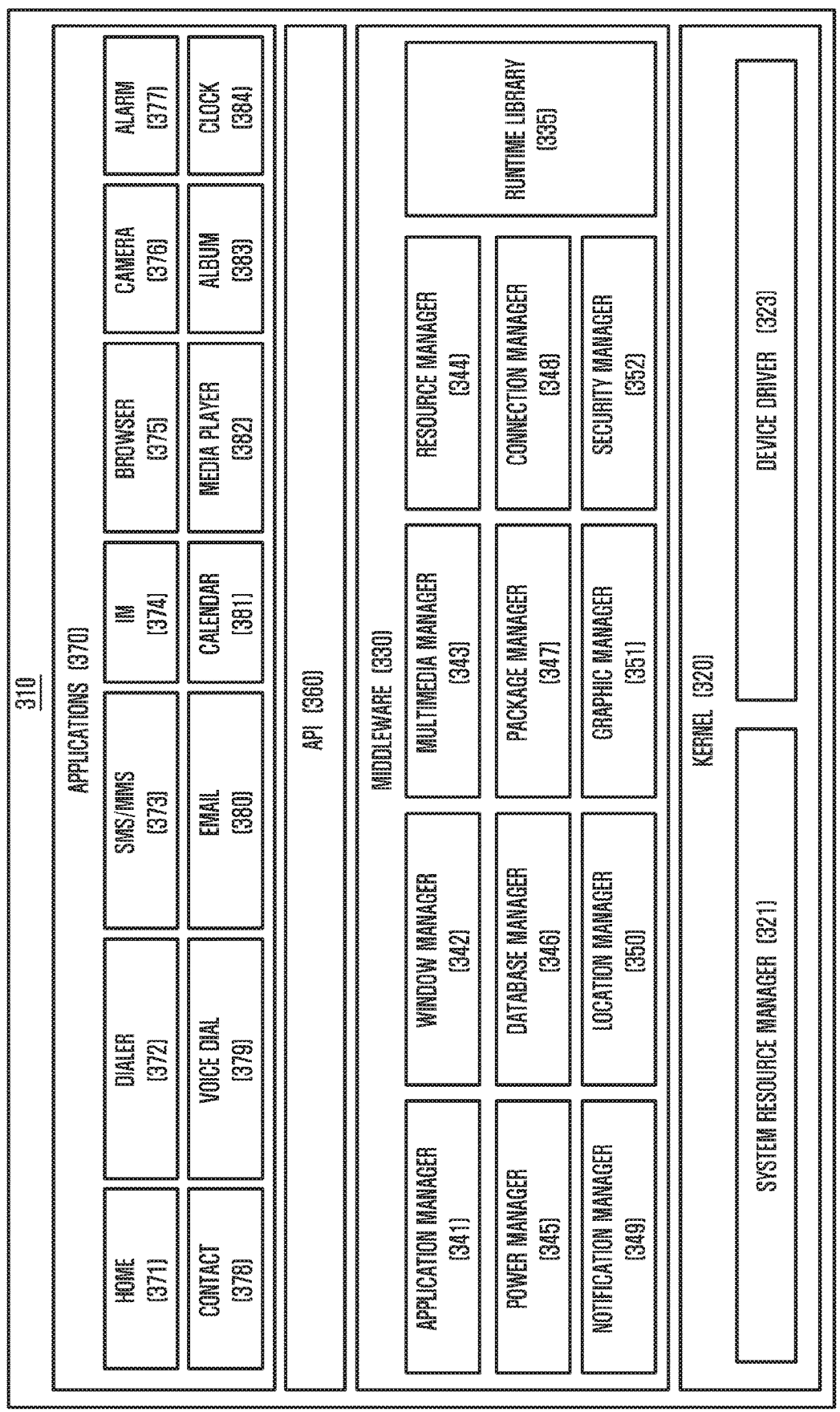
FIG. 1C is a block diagram of a program module according to various embodiments of the present disclosure.

FIG. 1C is a block diagram illustrating an example configuration of a programming module according to an example embodiment of the present disclosure.

Referring to FIG. 1C, a programming module 310 may be included (or stored) in the electronic device 100 (e.g., the memory 130) or may be included (or stored) in the electronic device 201 (e.g., the memory 230). At least a part of the programming module 310 may be implemented in software, firmware, hardware, or a combination of two or more thereof. The programming module 310 may be implemented in hardware (e.g., the electronic device 201), and may include an OS for controlling resources related to an electronic device and/or various applications (e.g., an application 370) that are executed in the OS. For example, the OS may be Android®, iOS®, Windows®, Symbian®, Tizen®, Bada®, and the like.

Referring to FIG. 1C, the programming module 310 may include a kernel 320, a middleware 330, an API 360, and/or one or more applications 370.

The kernel 320 (e.g., the kernel 141) may include a system resource manager 321 and/or a device driver 322. The system resource manager 321 may include, for example, a process manager (not illustrated), a memory manager (not illustrated), and a file system manager (not illustrated). The system resource manager 321 may perform the control, allocation, recovery, and the like of system resources. The device driver 322 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). In addition, according to an embodiment of the present disclosure, the device driver 312 may include an inter-process communication (IPC) driver (not illustrated).

The middleware 330 may include multiple modules previously implemented to provide a function used in common by the applications 370. In addition, the middleware 330 may provide a function to the applications 370 through the API 360 to enable the applications 370 to efficiently use limited system resources within the electronic device. For example, as illustrated in FIG. 1C, the middleware 330 (e.g., the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and any other suitable and/or similar manager.

The runtime library 335 may include, for example, a library module used by a complier, to add a new function by using a programming language during the execution of the application 370. According to an embodiment of the present disclosure, the runtime library 335 may perform functions which are related to input and output, the management of a memory, an arithmetic function, and the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a coder/decoder (codec) appropriate for the relevant format. The resource manager 344 may manage resources, such as a source code, a memory, a storage space, and the like of at least one of the applications 370.

The power manager 345 may operate together with a basic input/output system (BIOS), may manage a battery or power, and may provide power information and the like used for an operation. The database manager 346 may manage a database to enable the generation, search and/or change of the database to be used by at least one of the applications 370. The package manager 347 may manage the installation and/or update of an application distributed in the form of a package file.

The connection manager 348 may manage a wireless connection, such as, for example, a Wi-Fi connection and a BT connection. The notification manager 349 may display or report, to the user, an event, such as an arrival message, an appointment, a proximity alarm, and the like in such a manner as not to disturb the user. The location manager 350 may manage location information of the electronic device. The graphic manager 351 may manage a graphical effect, which is to be provided to the user, and/or a user interface related to the graphical effect. The security manager 352 may provide various security functions used for system security, user authentication, and the like. According to an embodiment of the present disclosure, when the electronic device (e.g., the electronic device 100) includes a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs to provide differentiated functions. In addition, the middleware 330 may dynamically delete some of the existing elements, or may add new elements. Accordingly, the middleware 330 may omit some of the elements described in the various embodiments of the present disclosure, may further include other elements, or may replace some of the elements with other elements, each of which performs a similar function and has a different name.

The API 360 (e.g., the API 145) is a set of API programming functions, and may be provided with a different configuration according to an OS. In the case, of Android® or iOS®, for example, one API set may be provided to each platform. In the case of Tizen®, for example, two or more API sets may be provided.

The applications 370 (e.g., the applications 147) may include, for example, a preloaded application and/or a third party application. The applications 370 (e.g., the applications 147) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Names of the elements of the programming module (e.g., the programming module 310) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. In addition, some of the operations may be omitted, or other operations may be added to the operations.

Figure 1D:
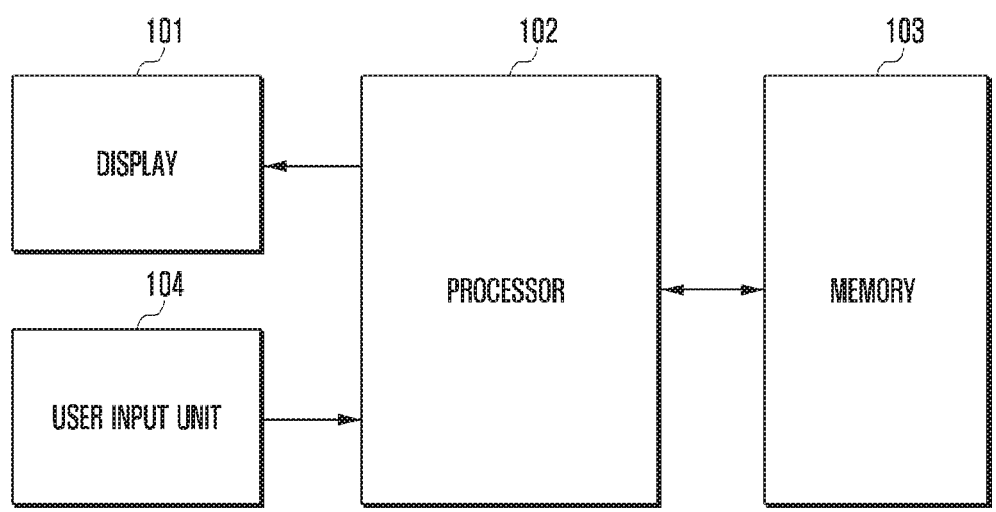
FIG. 1D is a block diagram of an electronic device according to various embodiments of the present disclosure.

FIG. 1D is a block diagram of an electronic device 100 according to various embodiments of the present disclosure.

With reference to FIG. 1D, the electronic device 100 is capable of including a display 101, a processor 102, a memory 103 and a user input unit 104. Although the electronic device 100 is configured in such a way to include the components as shown in FIG. 1D, it would be appreciated to those skilled in the art that it is an example for the sake of convenient description and may further include hardware/software components without departing from the scope of the present invention.

The display 101 is capable of providing an image-display area for displaying visual information/data. The display 101 is capable of including part or all of the display 160 shown in FIG. 1A. Alternatively, the display 101 is capable of including part or all of the display 260 shown in FIG. 1.

The memory 103 is capable of storing data or instructions related to at least one component of the electronic device 100. The memory 103 is capable of including part or all of the memory 130 shown in FIG. 1A. Alternatively, the memory 103 is capable of including part or all of the memory 230 shown in FIG. 1B.

The processor 102 is electrically connected to the display 101 and the memory 103 and is capable of controlling all the functions and operations of the electronic device 100. The processor 102 is capable of including part or all of the processor 120 shown in FIG. 1A. Alternatively, the processor 102 is capable of including part or all of the processor 210 shown in FIG. 1B.

The user input unit 104 is capable of receiving user inputs. The user input unit 104 is capable of including part or all of the input-output interface 150 shown in FIG. 1A. Alternatively, the user input unit 104 is capable of including part or all of the input device 20 shown in FIG. 1B.

In various embodiments, the memory 103 is capable of storing a schedule of works to be performed within a set time period. In this case, the display 101 is capable of displaying an alarm screen including a user interface (UI) regarding the progress of the schedule and a UI regarding the adjustment of the schedule, before the schedule starts.

When the alarm screen is displayed, the user input unit 104 is capable of receiving a user input selecting a user interface (UI) regarding the progress of the schedule or a UI regarding the adjustment of the schedule, included in the alarm screen.

If the processor 102 ascertains that a user input applied to the user input unit 104 selects the UI regarding the progress of the schedule, it performs a work associated with the progress of the schedule (called an associated work according to the progress of the schedule). If the processor 102 ascertains that a user input applied to the user input unit 104 selects the UI regarding the adjustment of the schedule, it performs a work associated with the adjustment of the schedule (called an associated work according to the adjustment of the schedule).

In various embodiments, if the processor 102 performs an associated work according to the progress of the schedule, it is capable of maintaining an event card related to the schedule. If the processor 102 performs an associated work according to the progress of the schedule, it is capable of displaying a screen including UI for performing the associated work. If the processor 102 performs an associated work according to the progress of the schedule, it is capable of displaying a screen including at least one of the following: a meeting completion UI for ending the management of the schedule, a meeting addition UI for additionally registering a meeting, and a UI for receiving proceedings. If the processor 102 performs an associated work according to the progress of the schedule, it is capable of providing alarms for managing individual sub-schedules of the schedule.

In various embodiments, if the processor 102 performs an associated work according to the adjustment of the schedule, it is capable of displaying a screen including at least one of the following: a substitute participant UI, a place adjustment proposal UI, a time adjustment proposal UI and a meeting absence UI. If the processor 102 performs an associated work according to the adjustment of the schedule, it is capable of transmitting, if the schedule is adjusted, information regarding the adjusted schedule to devices related to a business enterprise related to the adjusted schedule. If the UI regarding the adjustment of the schedule includes a UI regarding the cancellation of schedule, the processor 102 is capable of perforating an associated work for cancellation of the schedule.

In various embodiments, the memory 103 is capable of storing a schedule regarding an event category selected from a number of event categories. In this case, storing a schedule includes storing, e.g., information or data regarding schedules.

In this case, if the processor 102 performs an associated work according to the adjustment of the schedule, it is capable of performing associated works that differ from each other, depending on selected event categories.

Figure 2:
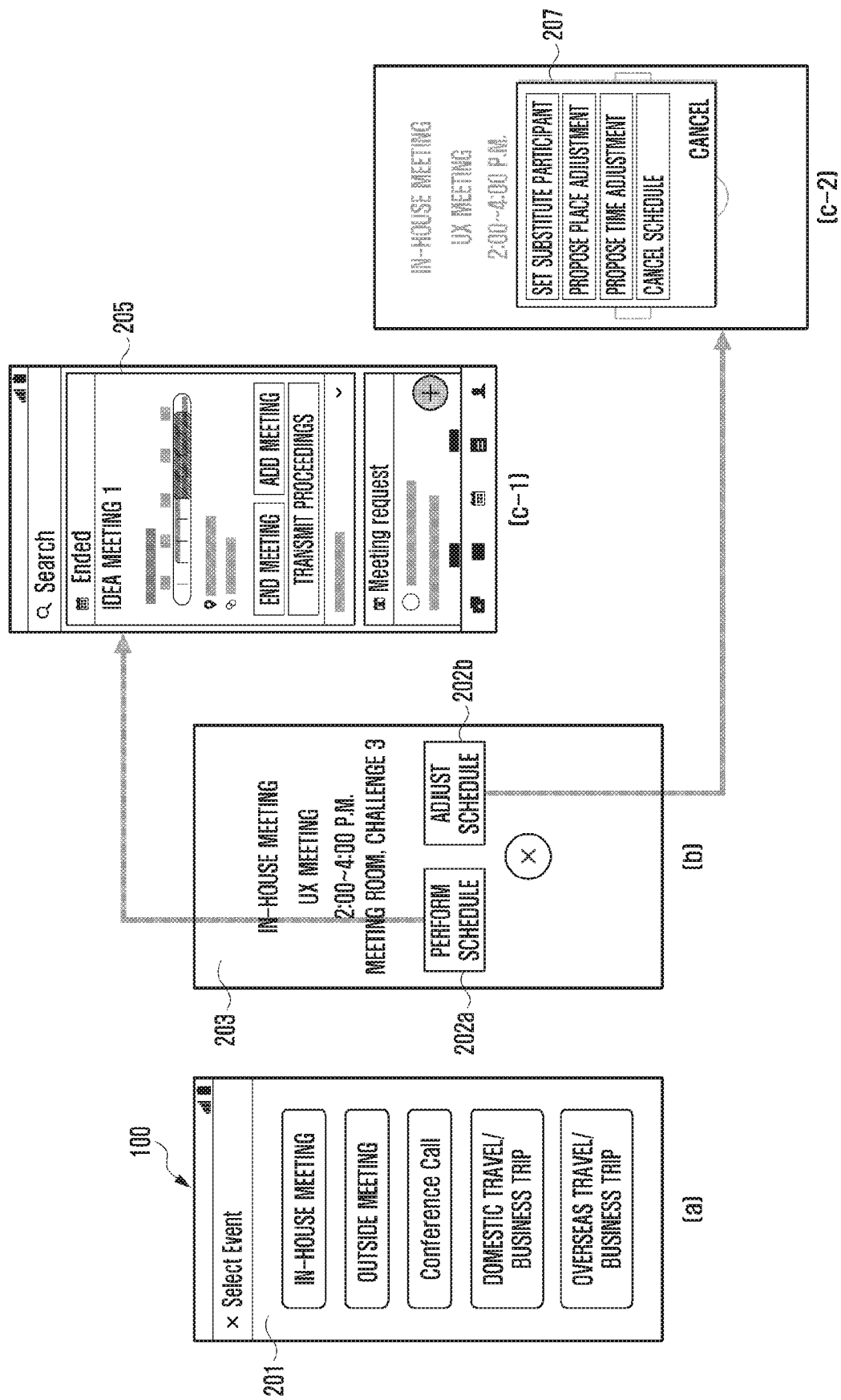
FIG. 2 shows diagrams that describe a method of managing schedules according to various embodiments of the present disclosure.

FIG. 2 shows diagrams that describe a method of managing schedules according to an embodiment of the present disclosure.

With reference to diagram (a) of FIG. 2, the electronic device 100 is capable of displaying a schedule registering screen 201 for receiving a schedule of events to be performed within a set time period.

The schedule registering screen 201 is capable of including a number of schedule categories. Examples of the schedule categories are an in-house meeting, an outside meeting, a conference call, domestic travel or a business trip, overseas travel or a business trip, etc.

If the electronic device 100 receives a user input selecting one from a number of schedule categories, it is capable of providing a UI for receiving details of the selected schedule category (e.g., a schedule title, a schedule duration, a participant, schedule content, etc.). When a user inputs detailed items via the UI, the electronic device 100 is capable of storing a schedule including detailed items regarding an event in the memory (e.g., the memory 130 shown in FIG. 1A, the memory 230 shown in FIG. 1B or the memory 103 shown in FIG. 1D).

The electronic device 100 receives a user's settings, such as a condition as to whether alarm is provided and an alarm providing time, and stores information related to the user's input settings in the memory (e.g., the memory 130 shown in FIG. 1A, the memory 230 shown in FIG. 1B or the memory 103 shown in FIG. 1D).

While the electronic device 100 is performing the processes, it is an alarm providing time that is a time before the schedule starts.

Therefore, as shown in diagram (b) of FIG. 2, the electronic device 100 is capable of displaying an alarm screen 203 including a UI 202a regarding the process of the schedule and a UI 202b regarding the adjustment of the schedule.

In this case, if the electronic device 100 receives a user input selecting the UI 202a, it is capable of performing an associated work according to the progress of the schedule as shown in diagram (c-1) of FIG. 2.

An example of the associated work according to the progress of the schedule is a process of maintaining an event card 205 related to the schedule. Another example of the associated work according to the progress of the schedule is a process of providing: a screen for additionally registering a new meeting, according to the selection of a UI for performing an associated work included in the event card 205, alter the schedule is ended; or a screen for receiving proceedings.

In this case, as shown in diagram (a) of FIG. 2, the electronic device 100 is capable of performing associated works that differ from each other, depending on a user's selected event categories. For example, if the selected schedule category is an in-house or outside meeting, the associated work according to the progress of the schedule may be a work for providing a screen for additionally receiving a new meeting or proceedings, etc. If the selected schedule category is a conference call, the associated work according to the progress of the schedule may be a work for providing a screen for receiving a request for an incoming call or a request for turning on a voice recorder, etc. If the selected schedule category is travel or a business trip, the associated work according to the progress of the schedule may be: a work for displaying information related to sub-schedules for the progress of the schedule; or a work for providing alarms for the progress of individual sub-schedules.

On the other hand, if the electronic device 100 receives a user input selecting the UI 202b, it is capable of performing an associated work according to the adjustment of the schedule as shown in diagram (c-2) of FIG. 2.

An example of the associated work according to the adjustment of the schedule is a work for displaying a schedule adjusting screen 207 for receiving an adjusted schedule. If the user registers a new schedule via the schedule adjusting screen 207, the electronic device 100 is capable of transmitting a message according to the newly registered schedule to a device related to a business enterprise or a device related to a participant related to the schedule.

Examples of the device related to a participant are a server or an electronic device (e.g., a terminal) owned by a participant, etc. Examples of the device related to a business enterprise are a server or an electronic device a terminal) owned by a business enterprise, etc.

In the case, as shown in diagram (a) of FIG. 2, the electronic device 100 is capable of performing associated works that differ from each other, according to a user's selected schedule category. For example, if the selected schedule category is an in-house meeting or an outside meeting, the associated work according to the adjustment of the schedule may be a work for providing a screen for receiving a substitute participant, an adjusted place, an adjusted time, etc. If the selected schedule category is a conference call, the associated work according to the adjustment of the schedule may be a work for providing a screen for additionally receiving a new meeting or proceedings, etc. If the selected schedule category is travel or a business trip, the associated work according to the adjustment of the schedule may be a work for providing a screen for adjusting sub-schedules for the progress of the schedule, a work for transmitting a message or an email to a device related to a business enterprise related to the adjusted schedule, etc.

FIG. 3 is a flowchart that describes a method of managing schedules according to an embodiment of the present disclosure.

With reference to FIG. 3, the electronic device 100 may have stored a schedule regarding a general meeting to be performed within a set time period (301).

As time goes by, it is an alarm providing time that is a time before the schedule starts. The alarm providing time may be preset by a user or may be automatically set. If the alarm providing time is automatically set, a notification providing time may be 15 to 30 minutes before, for example, an in-house meeting starts, or one or two hours before, for example, an outside meeting starts. In this case, the alarm providing time may be set, considering a distance between a user's location and the meeting place. For example, the larger the distance between a user's location and the meeting place the earlier the alarm providing time.

If time approaches a notification providing time, the electronic device 100 is capable of providing an alarm (303). For example, as shown in diagram (a) of FIG. 4A, the electronic device 100 is capable of displaying an alarm screen 401 which includes a participation UI 401a serving as a UI regarding the progress of the schedule and an absence UI 401b serving as a UI regarding the adjustment of the schedule.

The alarm screen 401 may also include a re-alarm UI 401c for re-providing the alarm screen after a preset period of time has elapsed. The alarm screen 401 may also include a UI 401d for closing the notification screen 401. The alarm screen 401 may further include details 401e regarding a schedule. For example, the details 401e regarding a schedule may include at least one of the following: a schedule category, a schedule title, schedule duration, a scheduled place, etc.

After that, the electronic device 100 is capable of determining whether a participation UI 401a or an absence UI 401b is selected (305).

If a participation UI 401a is selected in operation 305, the electronic device 100 is capable of performing an associated work according to the progress of the schedule.

The electronic device 100 is capable of maintaining an event card related to a schedule, as an example of the associated work, (307). The event card may be a memo corresponding to a schedule created when a user registers a new schedule, as a card provided by a schedule management application.

After that, the user may participate in the general meeting according to the registered schedule (309).

If the schedule of the general meeting is ended, the electronic device 100 is capable of displaying an event card related to the general meeting, as an associated work according to the progress of the schedule.

Figure 4A:
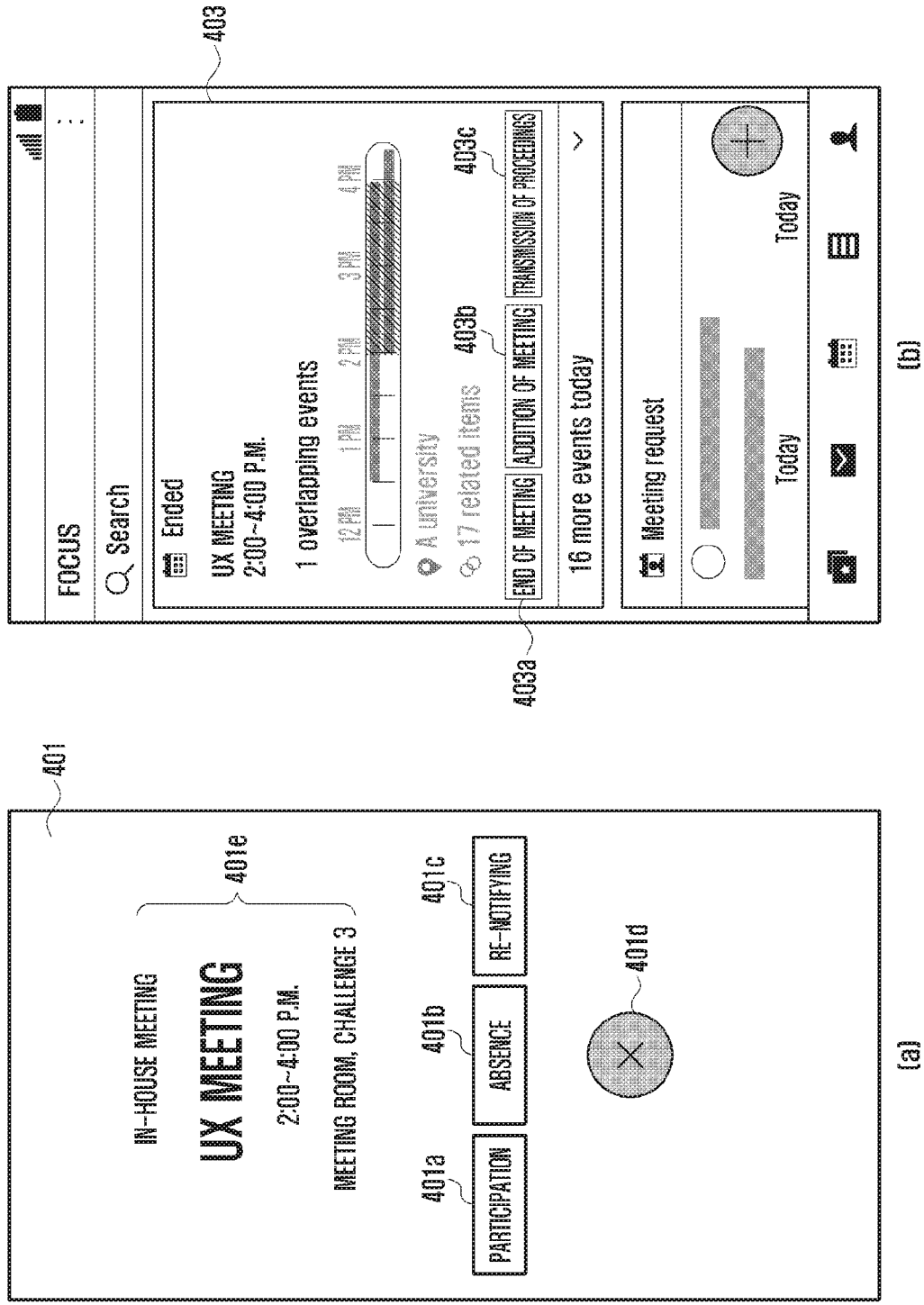
FIGS. 4A to 4C show screens when a schedule is managed according to various embodiments of the present disclosure.

For example, as shown in diagram (b) of FIG. 4A, the electronic device 100 is capable of displaying an event card 403 related to the general meeting on the screen. In this case, the event card 403 may be automatically displayed at the end time of the meeting. Alternatively, the event card 403 may be displayed when the user runs a schedule management application.

The event card 403 may include a UI for performing an associated work.

The UI for performing an associated work may be, for example, a meeting completion UI 403a, a meeting addition UI 403b, a proceedings transmission UI 403c, etc.

After that, the electronic device 100 is capable of determining whether a meeting completion UI 403a, a meeting addition UI 403b, or a proceedings transmission UI 403c is selected, as an associated work (311).

If a meeting completion UI 403a is selected, the electronic device 100 may end the schedule management for the general meeting.

On the ether hand, if a meeting addition UI 403c is selected, the electronic device 100 is capable of additionally registering a meeting (313).

Figure 4B:
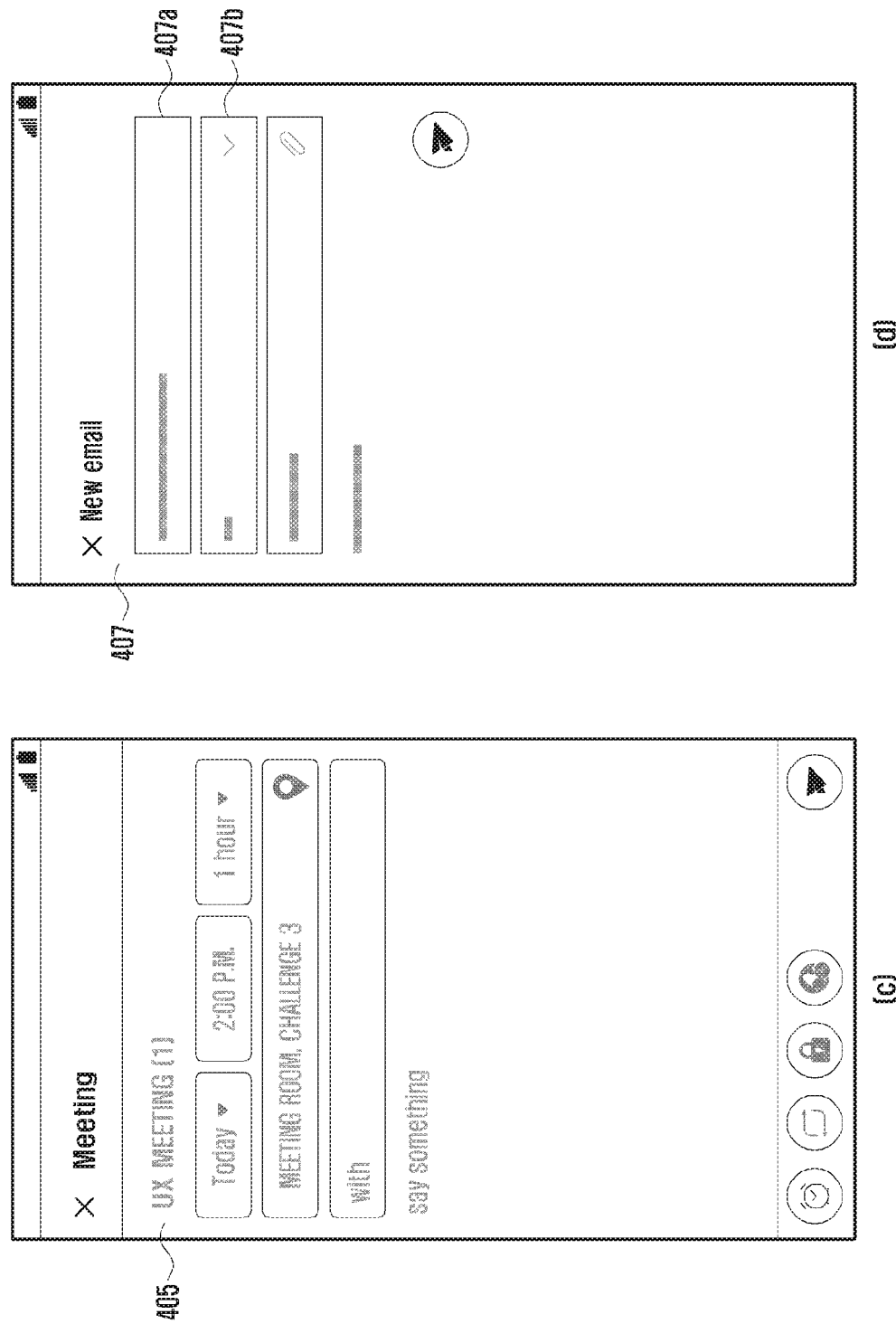

For example, as shown in diagram (c) of FIG. 4B, the electronic device 100 is capable of displaying an additional schedule registering screen 405 including a UI for receiving details.

The additional schedule registering screen 405 is capable of providing a UI for receiving details of an additional schedule (e.g., schedule title, participation durance, participation place, participant, participation content, etc.).

In this case, details may vary depending on types of an additionally registered meeting. For example, if an additionally registered meeting is a conference call, details of an additional schedule may further include a conference call number.

On the other hand, if a proceedings transmission UI 403c is selected in operation 311, the electronic device 100 is capable of performing the transmission of proceedings (315).

For example, as shown in diagram (d) of FIG. 4D, the electronic device 100 is capable of displaying a writing screen 407 (e.g., an email writing screen) for receiving proceedings.

The writing screen 407 is capable of providing a UI for receiving details (e.g., a title, a recipient, content, etc.). In this case, the title field 407a may display a title with text such as a meeting title, a meeting place, etc. which have been previously created. In addition, the title field 407a may also display notes, such as 'proceedings,' 'notification,' etc., which have been previously created.

In an embodiment, the event card may further include a new alarm setting UI (not shown).

In this case, the electronic device 100 is capable of receiving, from the user, a condition as to whether an alarm is provided and an alarm providing time, and storing information regarding the user's inputs in the memory.

If an absence UI 401b is selected in operation 305, the electronic device 100 is capable of performing an associated work to adjust the schedule before the schedule starts.

Figure 4C:
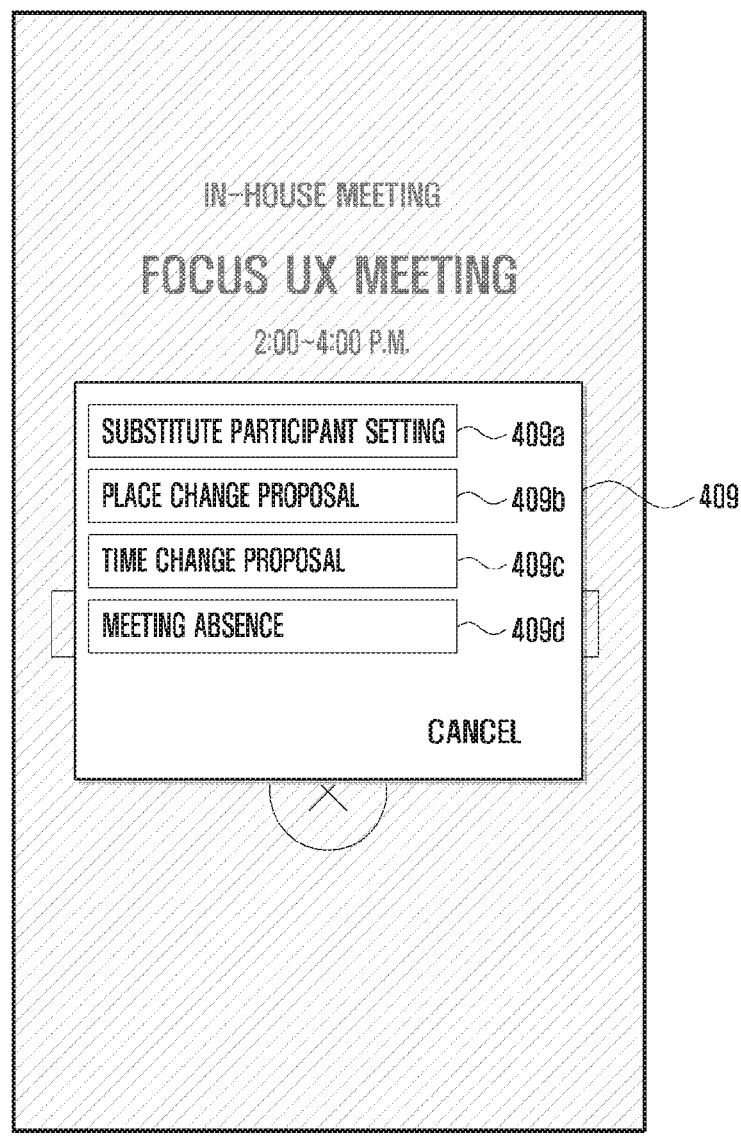

For example, as shown in FIG. 4C, the electronic device 100 is capable of displaying a schedule adjusting screen 409 to receive an adjusted schedule. The schedule adjusting screen 409 is capable of displaying at least one of the following: a substitute participant setting UI 409a, a place adjustment proposal UI 409b, a time adjustment proposal UI 409c and a meeting absence UI 409d.

After that, the electronic device 100 is capable of determining whether a substitute participant setting UI 409a, a place adjustment proposal UI 409b, a time adjustment proposal UI 409c, or a meeting absence UI 409d is selected, as an associated work to adjust a schedule.

If the electronic device 100 receives a user input selecting a substitute participant setting UI 409a, it is capable of transmitting, to a substitute participant, a message requesting the substitute participant to participate in the registered scheduled place for the user (319).

For example, if the electronic device 100 receives a user input selecting a substitute participant setting UI 409a, it is capable of displaying a writing screen (e.g., an email writing screen) 407 as shown in diagram (d) of FIG. 4B.

The writing screen 407 may provide a UI for receiving details (e.g., title, substitute participant, content, etc.). In this case, the title field 407a may display a title with text such as a meeting title, a meeting place, etc. which have been previously created. The title field 407a may also display notes such as 'transmission,' 'Fwd,' etc. which have been previously created.

The recipient field 407b may have displayed a recipient who is automatically recommended. The recipient may be an agent (a proxy, a representative) for the user, e.g., a person who has a high frequency of representation, a person who has been preset according to types of business or meeting, etc.

If the user writes, via the writing screen 407, a message requesting the agent to participate in a scheduled place for the user's place, and requests transmission of the message, the electronic device 100 is capable of transmitting the message requesting the participation to the agent.

On the other hand, if the electronic device 100 receives a user input selecting a place change UI 409b or a time change UI 409c in operation 317, it is capable of transmitting a message for proposing a place or time change to the participants (321).

For example, as shown in diagram (d) of FIG. 4B, the electronic device 100 is capable of displaying a writing screen 407.

The writing screen 407 is capable of providing a UI for receiving details (e.g., title, recipient, content, etc.).

In this case, the title field 407a may display notes, such as 'new place proposal,' 'new time proposal', etc., which have been previously created. The recipient field 407b may have previously, automatically displayed users who have shared schedules.

On the other hand, if the electronic device 100 receives a user input selecting a meeting absence UI in operation 317, it is capable of transmitting a message to participants, notifying of the user's meeting absence (323). The electronic device 100 is capable of deleting an event card related to a schedule (325). In this case, operation 325 may be performed before operation 323.

If it is the meeting end time, the electronic device 100 is capable of transmitting, to the agent and participants, a message inquiring about the meeting result (327).

Figure 5:
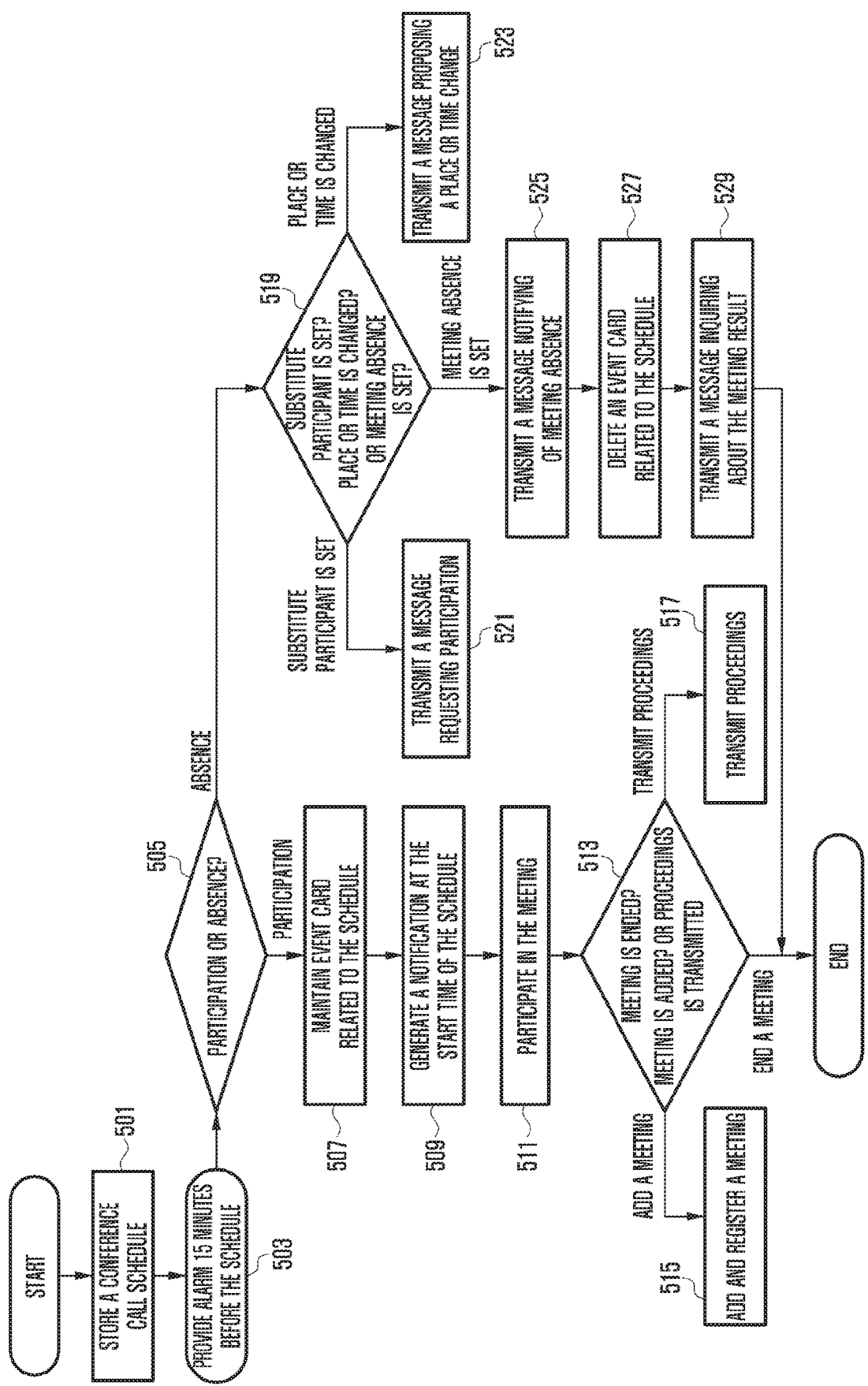
FIG. 5 is a flowchart that describes a method of managing schedules according to various embodiments of the present disclosure.

FIG. 5 is a flowchart that describes a method of managing schedules according to an embodiment of the present disclosure.

With reference to FIG. 5, the electronic device 100 may have stored a schedule regarding a conference call to be performed within a set time period (501).

As time goes by, it is an alarm providing time that is a time before the schedule starts. The alarm providing time may be preset by a user or may be automatically set. If the alarm providing time is automatically set, a notification providing time may be 15 to 30 minutes before the meeting starts.

If time approaches a notification providing time, the electronic device 100 is capable of providing an alarm (503). For example, if it is the alarm providing time, the electronic device 100 is capable of displaying an alarm screen 601 including a participation UI 601a serving as a UI regarding the progress of the schedule and an absence UI 601b serving as a UI regarding the adjustment of the schedule as shown in diagram (a) of FIG. 6. The alarm screen 601 may further include a re-alarm UI 601c for re-providing the alarm screen after a preset period of time has elapsed.

After that, the electronic device 100 is capable of determining whether a participation UI 601a or an absence UI 601b is selected (505).

If a participation UI 601a is selected in operation 505, the electronic device 100 is capable of performing an associated work according to the progress of the schedule.

The electronic device 100 is capable of maintaining an event card related to a schedule, as an example of the associated work, (507).

The electronic device 100 is capable of creating a notification at a schedule start time (or a schedule reservation time), as another example of the associated work, (509).

Figure 6:
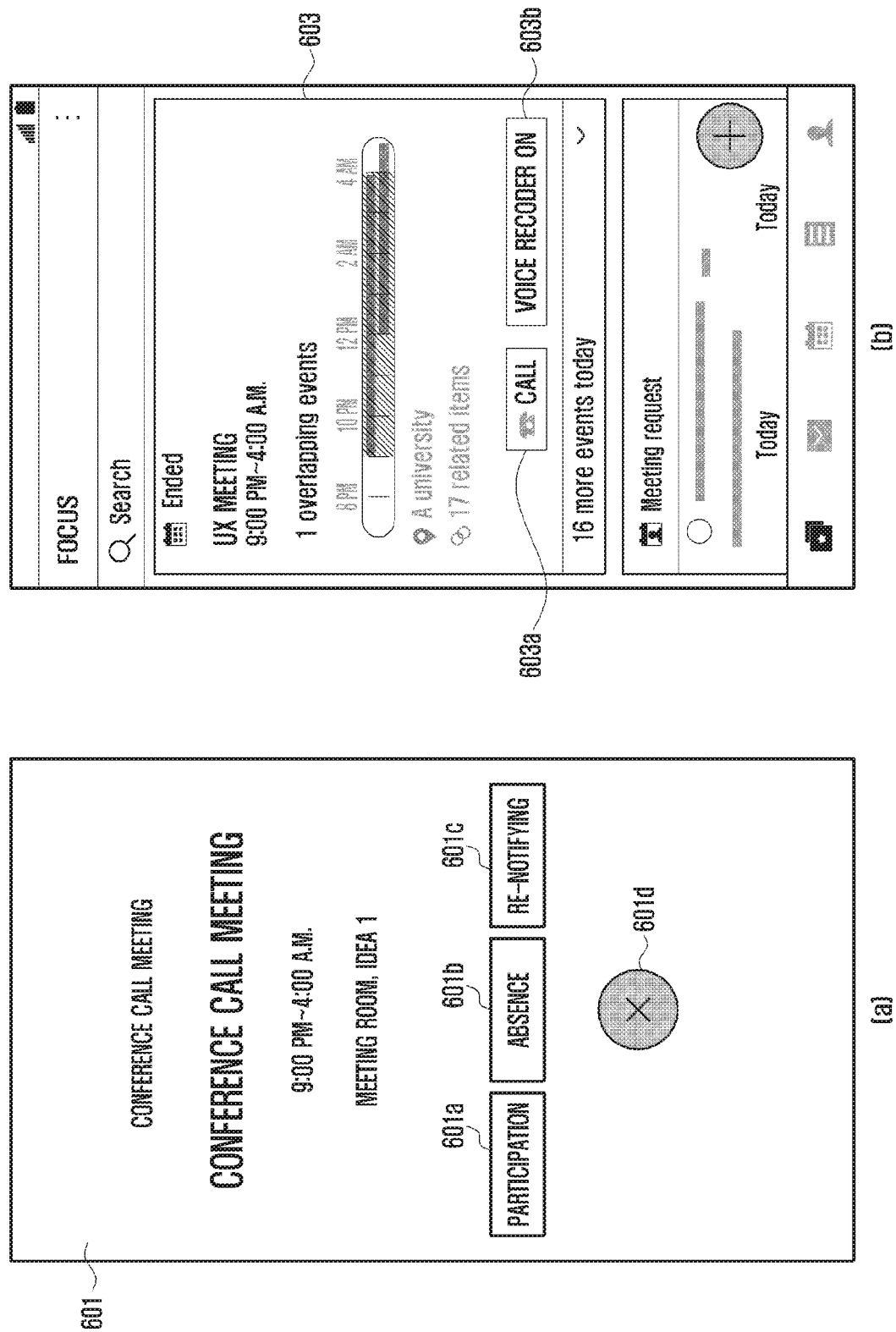
FIG. 6 shows screens when a schedule is managed according to various embodiments of the present disclosure.

For example, the electronic device 100 is capable of executing a schedule management application and displaying, on the screen, a schedule-related event card 603 including a call UI 603a and a voice recorder ON UI 603b as shown in diagram (b) of FIG. 6.

In this case, if the call UI 603*a* is selected, the electronic device 100 is capable of making a conference call to a registered called party's contact.

If the voice recorder ON UI 603*b* and the call UI 603*a* are both selected, the electronic device 100 is capable of making a call to a called party's contact, automatically executing a voice recorder application, and voice-recording conversation content during the call.

After that, the user may participate in the conference call according to the registered schedule (511).

If the conference call meeting is ended, the electronic device 100 is capable of displaying an event card related to a conference call, as an associated work according to the progress of the schedule.

After that, if the user selects a UI for performing an associated work included in the event card, the electronic device 100 is capable of continuously performing an associated work corresponding to the selected UI.

The processes of continuously performing an associated work are conducted as in operations 513 to 517 shown in FIG. 5, which correspond to operations 311 to 315 shown in FIG. 3, respectively. Since operations 311 to 315 were described above, a detailed description regarding operations 513 to 517 is omitted as follows.

In this case, if the proceedings writing screen is displayed as an associated work, the electronic device 100 is capable of automatically converting conversation content voice-recorded during the conference call voice recorder into text, and inserting the converted text into the body of an email or attaching a file of the converted text to an email. In addition, the electronic device 100 is also capable of attaching, to an email, a voice file, created as conversation is voice-recorded during the conference call, as an attachment file.

On the other hand, if the absence UI 601*b* is selected in operation 505, the electronic device 100 is capable of performing an associated work to adjust the schedule.

For example, as shown in FIG. 4C, the electronic device 100 is capable of displaying a schedule adjusting screen 409 for receiving an adjusted schedule.

After that, if the user selects a UI for performing an associated work included in the schedule adjusting screen 409, the electronic device 100 is capable of continuously performing an associated work corresponding to the selected UI.

The processes of continuously performing an associated work are conducted as in operations 519 to 529 shown in FIG. 5, which correspond to operations 317 to 327 shown in FIG. 3, respectively. Since operations 317 to 327 were described above, a detailed description regarding operations 519 to 529 is omitted as follows.

FIG. 7 is a flowchart that describes a method of managing schedules according to another embodiment of the present disclosure.

With reference to FIG. 7, the electronic device 100 may have stored a schedule regarding travel or a business trip to be performed within a set time period (701).

As time goes by, it is an alarm providing time that is a time before the schedule starts. The alarm providing time may be preset by a user or may be automatically set. If the alarm providing time is automatically set, a notification providing time may be one or two days before the schedule starts.

Figure 8A:
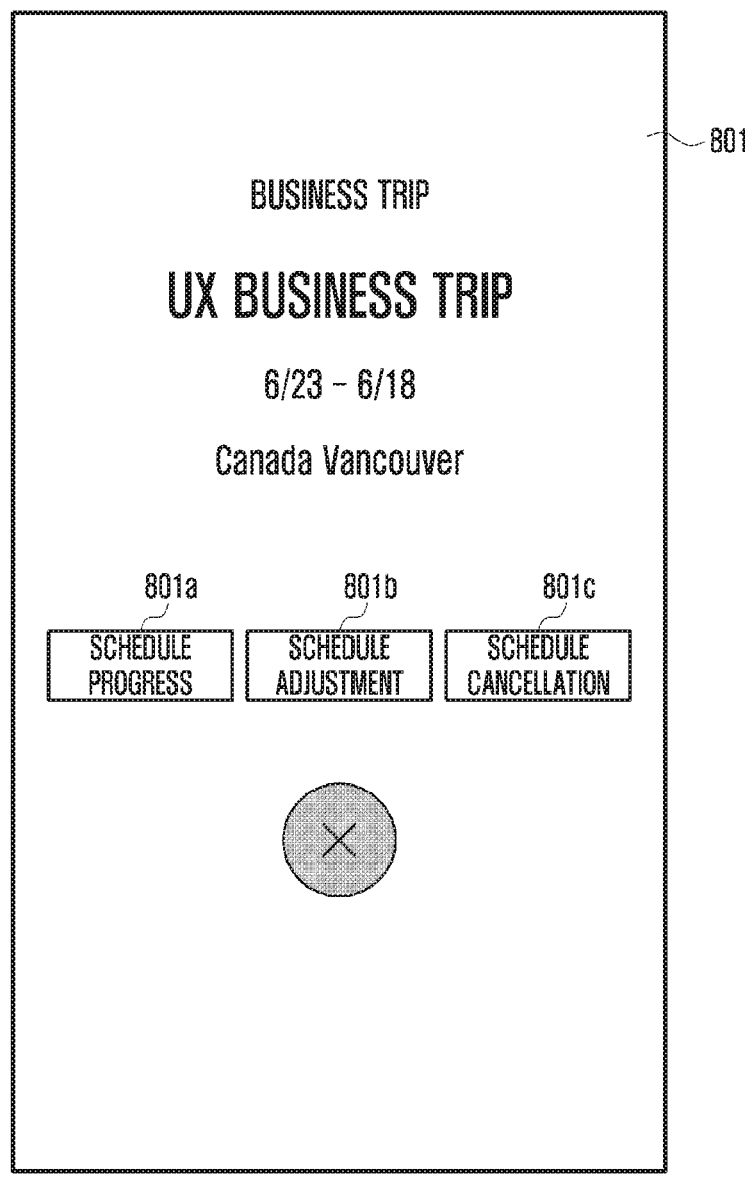

If time approaches an alarm providing time, the electronic device 100 is capable of providing an alarm (703). For example, if it is the alarm providing time, the electronic device 100 is capable of displaying an alarm screen 801 including a schedule progress 801*a* serving as a UI regarding the progress of the schedule and a schedule adjustment UI 801*b* serving as a UI regarding the adjustment of the schedule as shown in FIG. 8A. The electronic device 100 is also capable of displaying an alarm screen including a schedule cancelation UI 801*c* serving as another UI regarding the adjustment of the schedule.

After that, the electronic device 100 is capable of determining whether a schedule progress UI 801*a*, a schedule adjustment UI 801*b*, or a schedule cancellation UI 801*c* is selected (705).

If a schedule progress UI 801*a* is selected in operation 705, the electronic device 100 is capable of performing an associated work according to the progress of the schedule.

The electronic device 100 is capable of maintaining an event card related to a schedule, as an example of the associated work, (707).

The electronic device 100 is capable of importing an e-ticket, created when the user makes a payment or reservation for the schedule, and maintaining/adding sub-schedules of the e-ticket in/to an event card related to the entire schedule, as another example of the associated work, (709). In this case, the event card may be displayed along with contacts related to the sub-schedules (e.g., emails, phone numbers, etc.).

After that, the electronic device 100 is capable of managing a schedule scenario according to the sub-schedules.

For example, the electronic device 100 is capable of providing individual sub-schedules with alarms for the schedule management according to the present disclosure.

For example, the electronic device 100 is capable of providing schedule management alarms to an event related to the movement and an event related to the stay, respectively.

More specifically, if a schedule is domestic travel or a business trip, the electronic device 100 is capable of providing alarms to events related to movement, respectively, e.g., a departure place, a departure time, an arrival place, an arrival time, the required time for movement, a flying time, flying information, transportation, car allocation time, rental car pick-up time, rental car return time, rental car business enterprise place, rental car business enterprise address, etc. In addition, the electronic device 100 is capable of providing alarms to events related to stay, respectively, e.g., a check-in time, a check-out time, contact details of a lodge, an address of a lodge, a condition as to whether breakfast is included, meal times, etc.

After that, the user may travel or make a business trip based on the registered, entire schedule and sub-schedules (711).

On the other hand, if a schedule adjustment UI 801*b* is selected in operation 705, the electronic device 100 is capable of storing a schedule corrected as the user performs the re-registration of a schedule, as an associated work for the correction of the schedule (713).

For example, as shown in diagram (a) of FIG. 8B, the electronic device 100 is capable of displaying a schedule adjusting screen 803 for re-registering a schedule. As shown in diagram (a) of FIG. 8B, the schedule adjusting screen 803 may be a screen for selecting a category related to travel and a business trip. The categories on the screen may include a public transportation category, an e-ticket category, a hotel category, a rental car category, etc.

In this case, if the electronic device 100 receives a user input selecting a public transportation category 803*a*, it is capable of providing a public transportation schedule input screen 805 including a use date, a use time, a use place, etc. of public transportation, as shown in diagram (b) of FIG. 8B. If the electronic device 100 receives a user input selecting an e-ticket category 803*b*, it is capable of providing an e-ticket schedule input screen 807 including a use date, a use place, etc. of an e-ticket, as shown in diagram (c) of FIG. 8B.

If a schedule is re-registered according to a user input, the electronic device 100 is capable of notifying a device, related to a business enterprise related to a previously registered schedule or an adjusted schedule, of information regarding the canceled schedule or adjusted schedule, according to the adjusted schedule, (715). For example, if a schedule regarding an e-ticket is adjusted, the electronic device 100 is capable of transmitting an email or message regarding the adjusted e-ticket schedule to a device related to a business enterprise for managing e-tickets.

In this case, as shown in diagram (d) of FIG. 4B, the electronic device 100 is capable of displaying a writing screen 407 for notifying schedule adjustment. In this case, the title field 407*a* is capable of displaying notes, e.g., 'reservation change,' 'reservation confirmation request,' etc. which have been previously created.

After that, the electronic device 100 is capable of updating a previously registered schedule with the adjusted schedule (717). For example, the electronic device 100 is capable of deleting a previously registered schedule and storing the adjusted schedule in the memory. Alternatively, the electronic device 100 is capable of changing/correcting part of the previously registered schedule. The electronic device 100 is capable of updating part of the information (e.g., recipient, title, content, etc.), stored in a mail system for managing schedules, with the adjusted content.

On the other hand, if a schedule cancellation UI 801*c* is selected in operation 705, the electronic device 100 is capable of deleting registered sub-schedules (719). For example, the electronic device 100 is capable of deleting sub-schedules included in the e-ticket.

The electronic device 100 is capable of notifying a device, related to a business enterprise related to the registered schedule, of the schedule cancellation (721).

For example, the electronic device is capable of transmitting an email or message regarding the adjustment schedule to a device related to a business enterprise for managing e-tickets.

In this case, as shown in diagram (d) of FIG. 4B, the electronic device 100 is capable of displaying a writing screen 407 for notifying schedule cancellation. In this case, the title field 407*a* is capable of displaying notes, e.g., 'cancellation,' 'declined,' etc. which have been previously created.

After notifying the schedule cancellation, the electronic device 100 is capable of ending the schedule management according to travel and a business trip. For example, the electronic device 100 is capable of deleting an event card according to travel and a business trip.

It should be understood that the embodiment may be implemented in such a way as to display a navigation screen instead of the alarm screen described above. For example, if a registered schedule is performed in any other place, the electronic device 100 is capable of displaying a navigation screen, based on a place where the registered schedule is performed, and the user's current location, and providing guide information for the user to move to the schedule place.

FIG. 9 is a flowchart that describes a method of managing schedules according to another embodiment of the present disclosure.

The electronic device 100 may have stored a schedule of events to be performed within a set time period (901).

After that, the electronic device 100 is capable of displaying an alarm screen including a UI regarding the progress of the schedule and a UI regarding the correction of the schedule, before the schedule starts (903).

In this case, the alarm screen may further include a re-alarm UI for re-providing the alarm screen after a preset period of time has elapsed.

After that, the electronic device 100 is capable of determining whether one of the UIs is selected (905).

If the electronic device 100 ascertains that a UI regarding the progress of the schedule is selected in operation 905, it is capable of performing an associated work according to the progress of the schedule (907).

If the schedule is ended, the electronic device 100 is capable of performing an associated work according to the progress of the schedule, e.g., displaying a screen including a UI for performing an associated work. Alternatively, the electronic device 100 is capable of performing an associated work according to the progress of the schedule, e.g., displaying a screen including at least one of the following: a meeting completion UI for completing the management of a schedule, a meeting addition UI for additionally registering a meeting and a UI for receiving proceedings. Alternatively, the electronic device 100 is capable of performing an associated work according to the progress of the schedule, e.g., providing alarms for managing individual sub-schedules of a schedule.

On the other hand, if the electronic device 100 ascertains that a UI regarding the correction of the schedule is selected in operation 905, it is capable of performing an associated work for the correction of the schedule (909).

The electronic device 100 is capable of performing an associated work according to the correction of the schedule, e.g., displaying a screen including at least one of the following: a substitute participant UI, a place adjustment proposal UI, a time adjustment proposal UI and a meeting absence UI. Alternatively, the electronic device 100 is capable of performing an associated work according to the correction of the schedule, e.g., transmitting information regarding an adjusted schedule to a device related to a business enterprise related to the adjusted schedule. If the UI regarding the correction of the schedule includes a UI regarding the cancellation of the schedule, the electronic device 100 is capable of performing an associated work according to the correction of the schedule, e.g., performing an associated work for the cancellation of the schedule. If the electronic device 100 has stored schedules related to an event category selected from a number of event categories in the memory 103, it is capable of performing an associated work according to the adjustment of the schedule, e.g., performing associated works that differ from each other depending on the selected event category.

Figure 10:
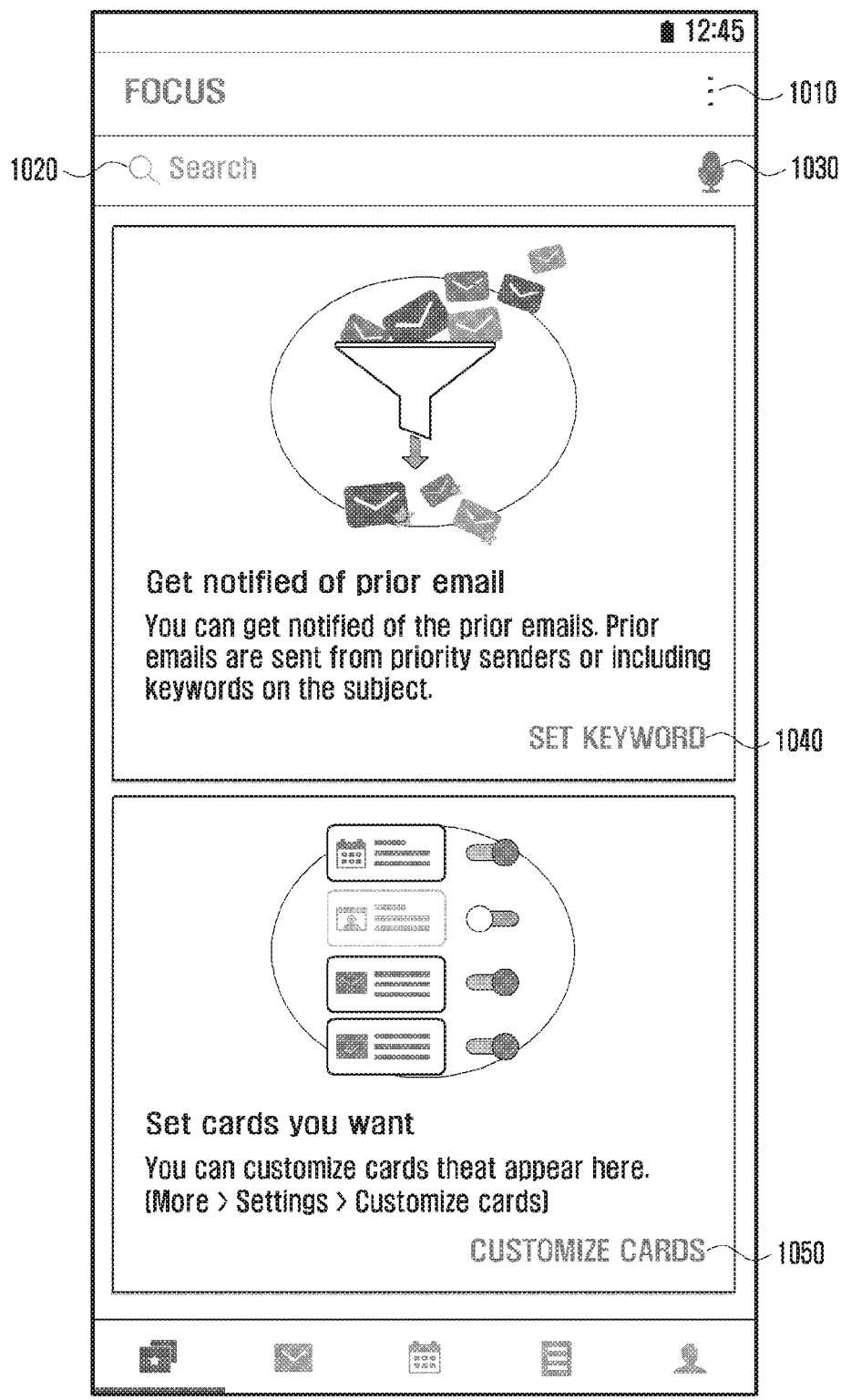
FIG. 10 is a diagram showing an application for executing a schedule management method according to various embodiments of the present invention.

FIG. 10 is a diagram showing an application for executing a schedule management method according to various embodiments of the present invention.

An application for executing a schedule management method according to various embodiments of the present invention is capable of displaying a setup screen.

With reference to FIG. 10, the setup screen is capable of including a more view button 1010, a keyword input button 1020, a voice input button 1030, a keyword setup screen 1040, and an event card setup screen 1050.

The more view button 1010 is referred to as a button for controlling the display of other settings which are hidden, not shown on the setup screen.

The keyword input button 1020 is referred to as an input field that allows the user to input a keyword to be searched, while running the application for executing a schedule management method according to various embodiments of the present invention. For example, when the user touches the keyword input screen, an input tool for the keyword input may be displayed. If the user inputs a keyword related to a schedule to the input screen (input field) using an input tool, the application is capable of displaying an event card related to the input keyword. In various embodiments of the present invention, an example of the input tool for the keyword input is a keyboard.

When the user touches to the voice input screen 1030, the application is capable of controlling a module corresponding to a voice input, in response to the user's input touch. In an embodiment, the application is capable of: activating a module corresponding to the voice input; recognizing a keyword that the user speaks in natural language, via the activated module; and displaying an event card related to the recognized keyword.

The keyword setup screen 1040 is referred to as a screen (screen area) for setting a keyword related to a schedule corresponding to an event card.

In various embodiments of the present invention, the electronic device 100 is capable of collecting information from contacts, emails, and applications which are registered by the user. The electronic device 100 is capable of: extracting information related to a set keyword from the collected information; and automatically creating an event card using the extracted information.

For example, the electronic device 100 is capable of collecting: place, time, etc. related to a schedule, as schedule-related data corresponding to a keyword related to a schedule, from data related to the registered contacts and emails; location data corresponding to a keyword related to a schedule from a map application registered by a user; and information corresponding to a keyword related to a schedule from a weather application previously registered by a user. The electronic device 100 is capable of automatically creating and displaying an event card, using the collected data.

The event card setup screen 1050 is referred to as a screen for setting items for the event card created via the application.

As described above, various embodiments of the present invention allow users to customize (set, control) types of information that the users want to see among the various information related to a schedule included in an event card, on the event card setup screen 1050. For example, a user may set to display only information related to schedules and emails among the schedules, emails, and contacts included in and event card, on the event card setup screen 1050.

Figure 11A:
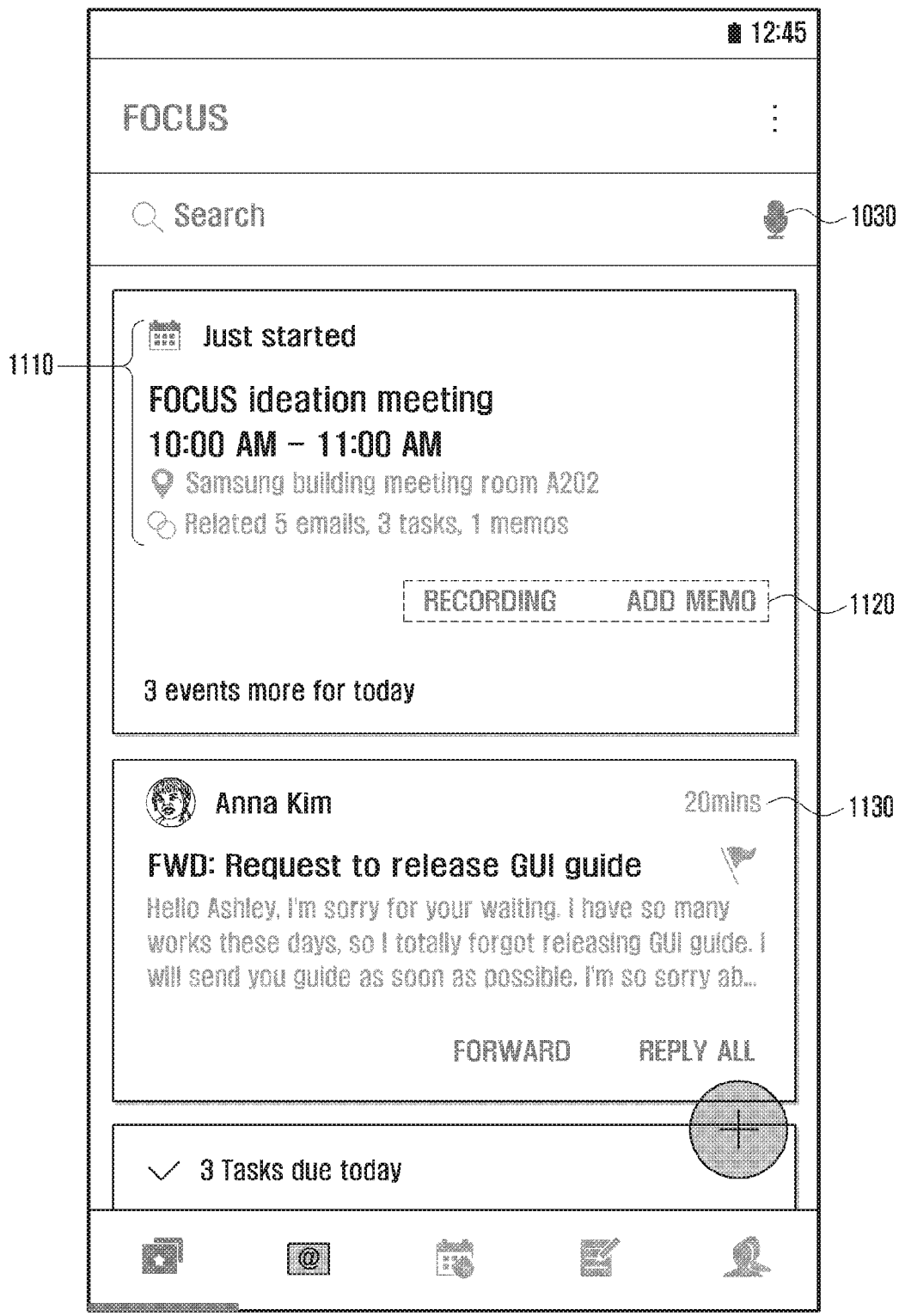

FIGS. 11A to 11B are a diagram showing an event card according to various embodiments of the present invention.

FIG. 11A is a diagram of a screen showing an event card where an information display area 1110 displaying details corresponding to an event card and a function display area 1120 displaying functions related to a schedule.

The information display area 1110 is capable of displaying information related to a condition as to whether a schedule progresses. The information related to a condition as to whether a schedule progresses is referred to as information related to a condition as to whether it is a time before the schedule starts, information related to a condition as to whether a schedule is in progress, and information related to a condition as to whether a schedule is ended.

The information display area 1110 is capable of displaying location information related to a schedule. For example, as shown in FIG. 11A, the information display area 1110 shows location information (e.g., meeting room A202) where a schedule (e.g., an idea meeting) progresses.

The information display area 1110 is capable of displaying information related to a schedule. The information related to a schedule may include emails, tasks, the numbers of memos, and content, related to a schedule. For example, as shown in FIG. 11A, the information display area 1110 shows an email, a task, and the number of memos, related to a schedule. Alternatively, content of a memo, a task and an email, related to a schedule, may be displayed on a separate area 1130 separated from the event card. With reference to FIG. 11A, the separate area 1130 is capable of displaying content of an email related to a schedule.

The information related to a schedule displayed on the information display area 1110 may include information stored in an application preset by a user. For example, if a user has set an email application and a memo application, information related to a schedule among the data stored in the set applications may be displayed on the information display area 1110.

The information display area 1110 is capable of displaying various types of information related to a schedule, e.g., transportation information, restaurant information, etc., related to a place where a schedule is performed.

Details displayed on the information display area 1110 may be changed according to the progress of a schedule. For example, information, displayed on the information display area 1110 before a meeting starts, may include information regarding transportation that a user uses for arrival at the meeting place. Information, displayed on the information display area 1110 after a meeting is ended, may include: information regarding transportation that a user uses for arrival at various locations, e.g., a place where another meeting is performed, one's house, company, etc.; or location information corresponding to a place where a meeting is performed.

In an embodiment of the present invention, when a user applies a touch to the information display area 1110, information displayed on the information display area 1110 may be displayed on a separate screen in response to the user's input touch.

With reference to FIG. 11B, content, or details, displayed on the information display area 1110, is shown on the display in response to a user's touch applied to the information display area 1110. Content of an email related to a schedule and a list of files attached to an email may be shown on the display. For example, a list of emails with a title similar to that of a schedule, a list of emails transmitted to/received from users related to a schedule, and a list of files attached to the emails on the email list may be displayed.

Figure 11C:
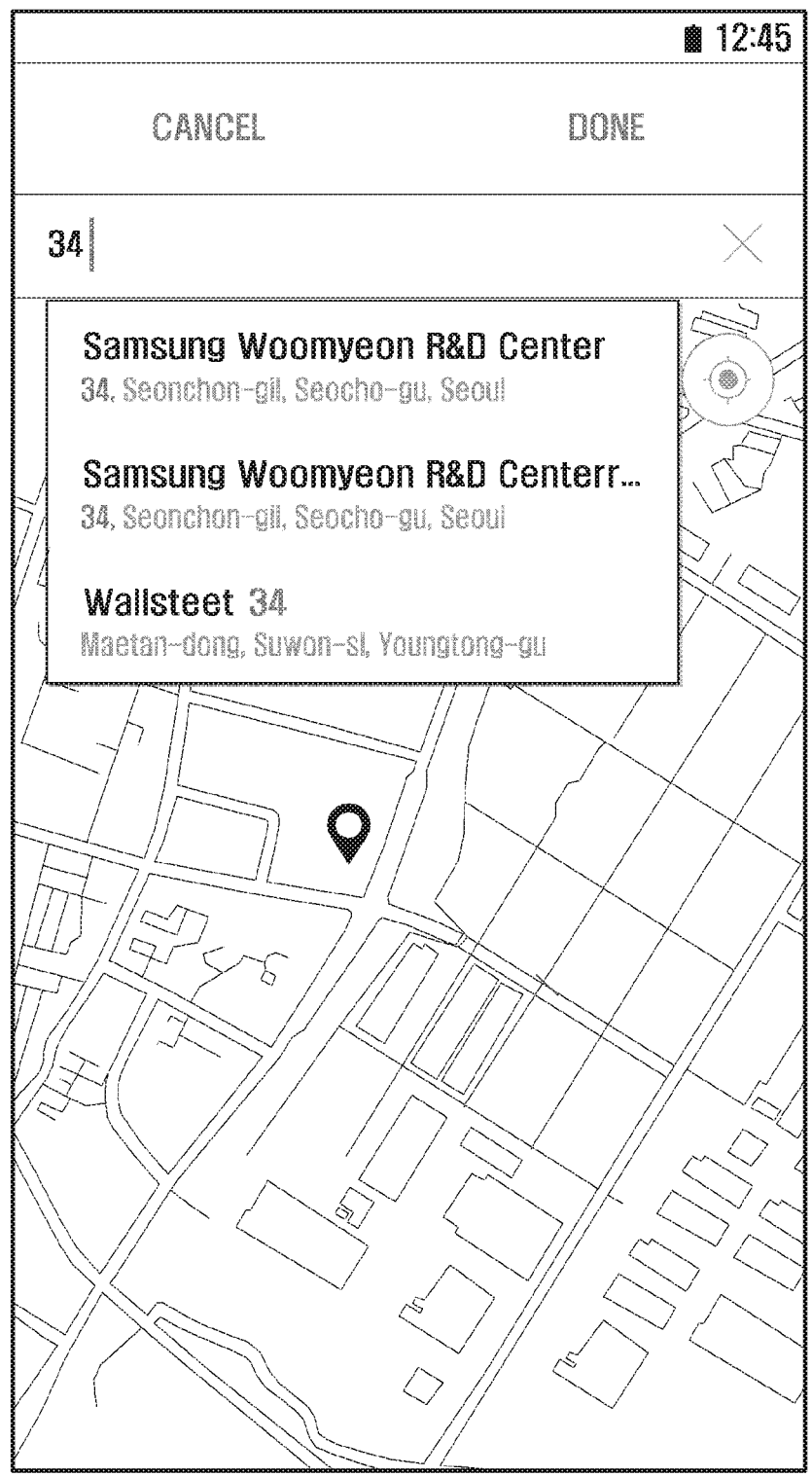

With reference to FIG. 11C, location information regarding a place where a schedule is performed, among the information related to a schedule, may be displayed along with a map, in response to a touch applied to the information display area 1110.

Figure 11D:

In various embodiments of the present invention, a user may add a list of other users participating in a schedule to the event card. With reference to FIG. 11D, a user may also add, delete, and change a list of users related to a schedule.

In various embodiments of the present invention, a list of users related to a schedule may also be displayed on the information display area 1110.

The schedule-related-function display area 1120 is referred to as an area where functions related to a schedule among the functions of the electronic device are displayed. Examples of the functions related to a schedule are a voice recorder, a memo input function, etc. The schedule management method according to various embodiments of the present invention is capable of displaying various functions which can be used during the schedule on a function display area related to schedules of an event card inside.

In various embodiments of the present invention, a user performing a schedule may execute a function of the electronic device, using at least one function, related to a schedule and displayed on the schedule-related-function display area 1120. For example, if a user applies a touch to a voice recorder displayed on the schedule-related-function display area 1120, the electronic device is capable of controlling a voice recording module to perform a voice recording function.

The schedule-related-function display area 1120 is capable of displaying other functions according to the change of the progress flow of a schedule. In various embodiments of the present invention, functions displayed on the schedule-related-function display area 1120 before the schedule starts, functions displayed on the schedule-related-function display area 1120 while a schedule is in progress, and functions displayed on the schedule-related-function display area 1120 after a schedule is ended may differ from each other.

For example, before the schedule starts, a function for transmitting an email to participants, a function for executing a map application, and a function for adding a memo may be displayed on the schedule-related-function display area 1120.

While a schedule is in progress, a function for performing a voice recording, a function for pausing in a voice recording function, and a function for adding a memo may be displayed on the schedule-related-function display area 1120.

After a schedule is ended, a function for displaying the end of a schedule, a function for changing tasks may be displayed on the schedule-related-function display area 1120.

The schedule-related-function display area 1120 may display various types of functions according to a user's selections. Alternatively, the processor of the electronic device is capable of detecting a user's frequently used schedule-related-functions and displaying them on the schedule-related-function display area 1120.

Figure 12A:
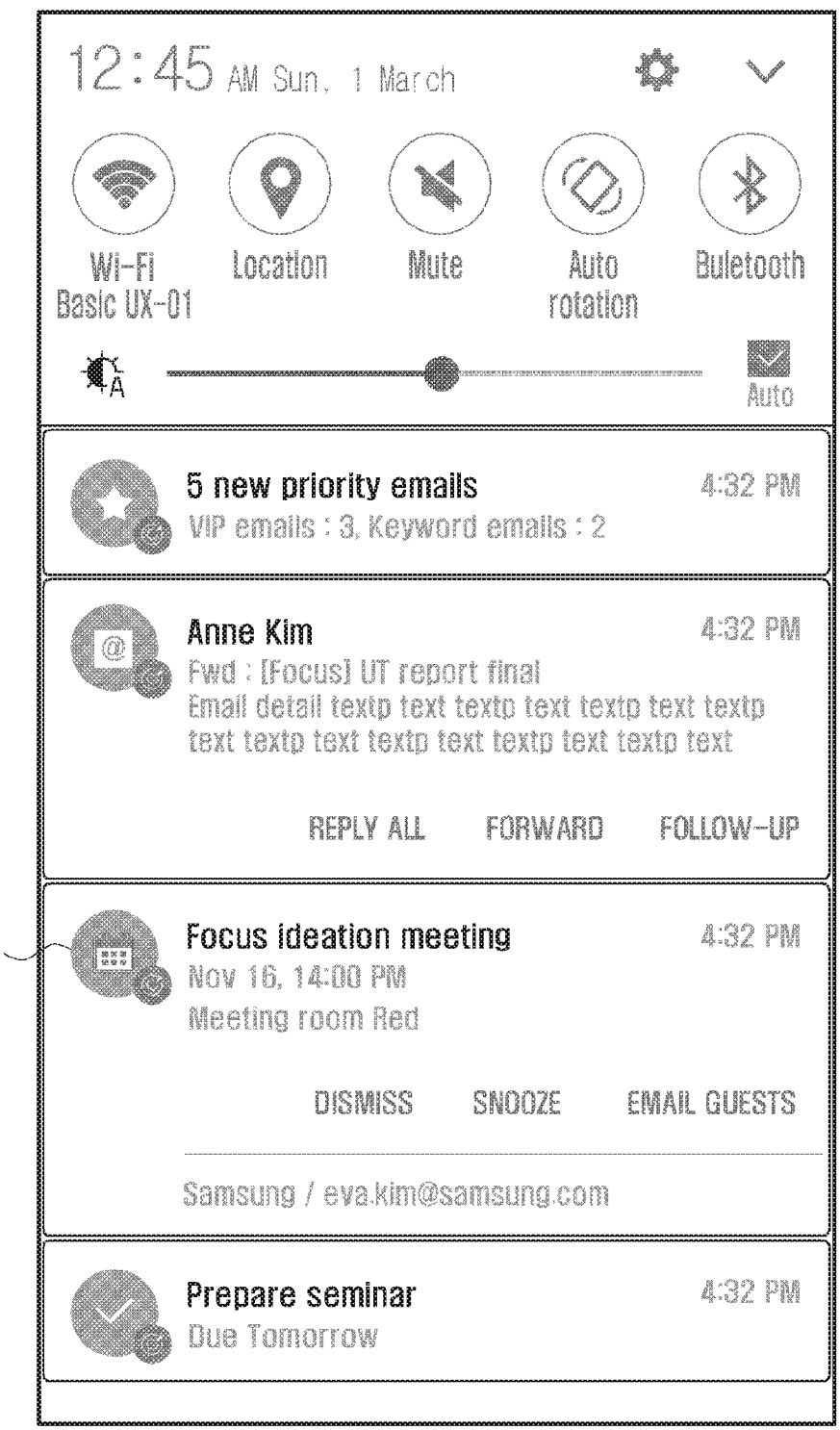
FIGS. 12A to 12C are screens displaying an event card according to various embodiments of the present invention.
Figure 12B:
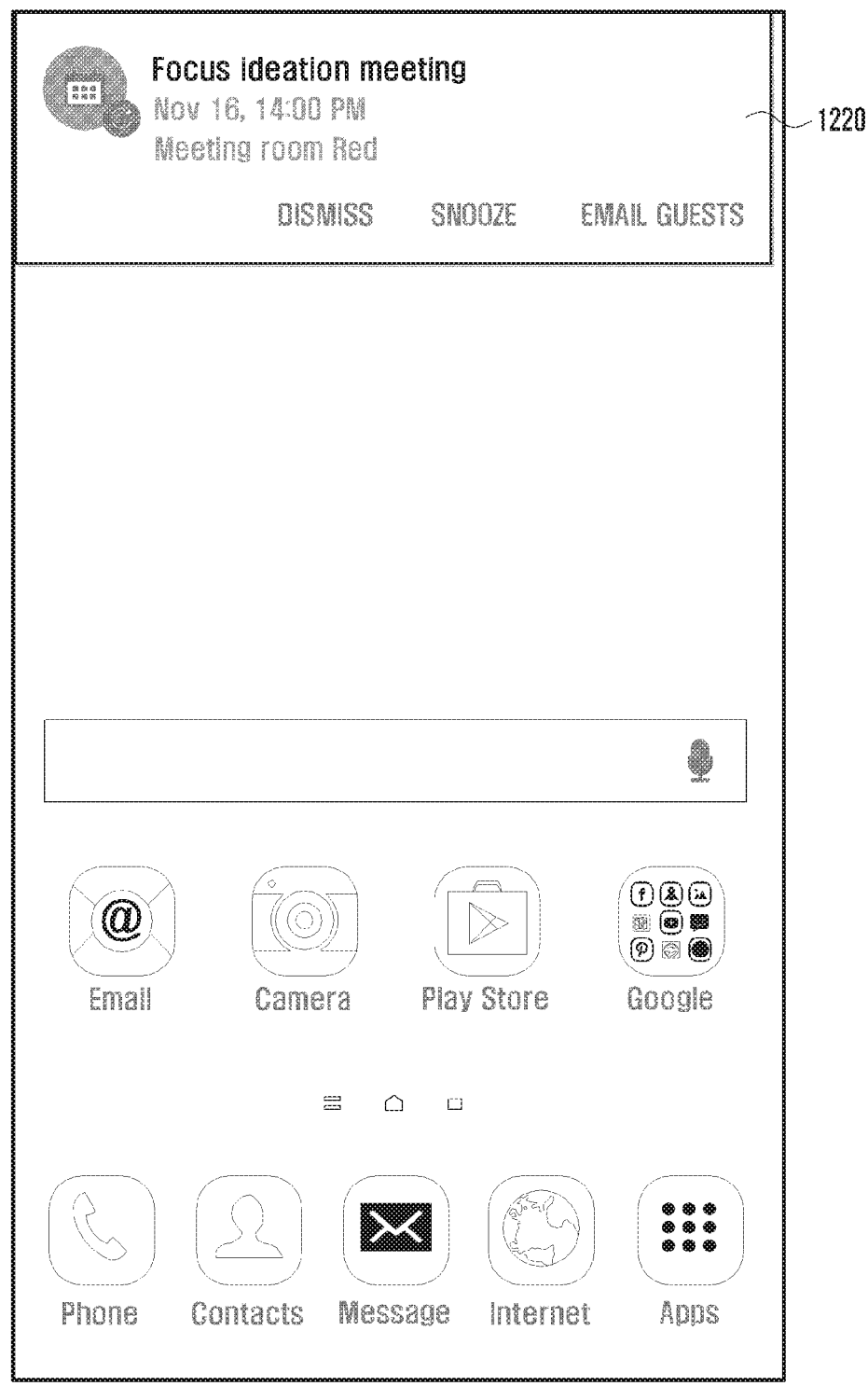
Figure 12C:

FIGS. 12A to 12C are screens displaying an event card according to various embodiments of the present invention.

In various embodiments of the present invention, an event card may be displayed on the application shown in FIG. 10, and may also be output by various methods including a notification message, a widget, etc. of an electronic device.

With reference to FIG. 12A, an event card 1210 according to an embodiment of the present invention may be displayed on a noty window outputting a notification message of an electronic device.

With reference to FIG. 12B, an event card 1220 according to an embodiment of the present invention may be displayed on a separate window outputting a notification message, in the top of the display of an electronic device.

Alternatively, an event card according to various embodiments of the present invention may also be displayed on a separate wearable device connected to an electronic device.

With reference to FIG. 12C, an event card 1230 according to an embodiment of the present invention may be output to the display of a separate wearable device connected to an electronic device. The wearable device is capable of receiving an event card, outputting the received event card on the display, and outputting a notification message along with vibration, sound, etc.

It should be understood that the embodiments of the present disclosure may also be modified to output an alarm screen along with alarms, such as sound, vibration, etc., according to a user's settings. It should be understood that the electronic device is capable of controlling the output of the alarm screen and alarms, based on location information collected by the electronic device. In various embodiments of the present invention, the electronic device may be set in such a way that: if it ascertains that a current location is a place where a schedule is performed, based on its collected location information, it does not output an alarm screen and an alarm message.

In various embodiments of the present invention, the electronic device is capable of outputting data displayed on the alarm screen via the speaker. For example, if the electronic device ascertains that the user got up, based on data collected by the sensor module, it may output information related to schedule management via the speaker.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A schedule management method of an electronic device, the method comprising:
   storing, by a processor, a schedule associated with an event on a memory, wherein the event includes a category and occurs during a set time period including a start time, and wherein the schedule includes an alarm providing time indicating a time before the start time;
   when a current time matches the alarm providing time, displaying, on a display, an alarm screen including a first user interface (UI) regarding a progress of the schedule and a second UI regarding an adjustment of the schedule;
   receiving an input indicating a selection of the first UI or the second UI;
   when the first UI is selected, displaying, by the processor, content associated with the schedule based on the category of the event; and
   when the second UI is selected, displaying content associated with adjusting the schedule based on the category of the event; and
   transmitting, by the processor, information regarding the adjusted schedule to another device corresponding to a participant related to the adjusted schedule in response to identifying that the schedule is adjusted.

2. The method of claim 1, wherein displaying the content associated with the schedule comprises:
   maintaining an event card related to the schedule.

3. The method of claim 1, wherein displaying the content associated with the schedule comprises:
   displaying, if the schedule is ended, a screen including a third UI.

4. The method of claim 1, wherein displaying the content associated with the schedule comprises displaying a screen including at least one:
   a meeting completion UI for ending management of the schedule,
   a meeting addition UI for additionally registering a meeting, or
   a third UI for receiving proceedings.

5. The method of claim 1, wherein displaying the content associated with the schedule comprises:
   providing alarms for managing individual sub-schedules of the schedule.

6. The method of claim 1, wherein displaying the content associated with adjusting the schedule comprises displaying a screen including at least one of:
- a substitute participant UI,
- a place adjustment proposal UI,
- a time adjustment proposal UI, or
- a meeting absence UI.

7. The method of claim 1, wherein displaying the content associated with adjusting the schedule comprises:
- performing, if the second UI includes a third UI regarding a cancellation of the schedule, the cancellation of the schedule.

8. The method of claim 1, wherein:
- storing the schedule comprise, selecting the category from a number of event categories; and
- displaying the content associated with adjusting the schedule comprises displaying different content depending on the selected category.

9. The method of claim 1, wherein the alarm screen comprises:
- a re-alarm UI for re-providing the alarm screen after a preset period of time has elapsed.

10. An electronic device comprising:
- a memory configured to store a schedule associated with an event, wherein the event includes a category and occurs during a set time period including a start time, and wherein the schedule includes an alarm providing time indicating a time before the start time;
- a display configured to display an alarm screen including a first user interface (UI) regarding a progress of the schedule and a second UI regarding an adjustment of the schedule;
- a user input unit configured to receive a user input selecting the first UI regarding the progress of the schedule or the second UI regarding the adjustment of the schedule; and
- a processor electrically connected to the memory, the display and the user input unit, and configured to:
  - when the first UI is selected, display, on the display, content associated with the schedule based on the category of the event,
  - when the second UI is selected, display, on the display, content associated with adjusting the schedule based on the category of the event, and
  - transmit, in response to identifying that the schedule is adjusted, information regarding the adjusted schedule to another device corresponding to a participant related to the adjusted schedule.

11. The electronic device of claim 10, wherein to display the content associated with the schedule, the processor is configured to maintain an event card related to the schedule.

12. The electronic device of claim 10, wherein to display the content associated with the schedule the processor is configured to display, on the display, if the schedule is ended, a screen including a third UI.

13. The electronic device of claim 10, wherein to display the content associated with the schedule, the processor is configured to display, on the display, a screen including at least one of:
- a meeting completion UI for ending a management of the schedule,
- a meeting addition UI for additionally registering a meeting, or
- a third UI for receiving proceedings.

14. The electronic device of claim 10, wherein to display the content associated with the schedule, the processor is configured to provide alarms for managing individual sub-schedules of the schedule.

15. The electronic device of claim 10, wherein to display the content associated with adjusting the schedule, the processor is configured to display, on the display, a screen including at least one of:
- a substitute participant UI,
- a place adjustment proposal UI,
- a time adjustment proposal UI, or
- a meeting absence UI.

16. The electronic device of claim 10, wherein to display the content associated with adjusting the schedule, the processor is configured to perform, if the second UI includes a third UI regarding a cancellation of the schedule, the cancellation of the schedule.

17. The electronic device of claim 10, wherein:
- the category of the event is selected from a number of event categories; and
- to display the content associated with adjusting the schedule, the processor is configured to display, on the display, different content depending on the category.

18. A computer-readable recording medium comprising instructions for controlling an operation of an electronic device, the instructions configured to, when executed by a processor of the electronic device, cause the processor to:
- store a schedule associated with an event, wherein the event includes a category and occurs during a set time period including a start time, and wherein the schedule includes an alarm providing time indicating a time before the start time;
- when a current time matches the alarm providing time, display an alarm screen including a first user interface (UI) regarding a progress of the schedule and a second UI regarding an adjustment of the schedule;
- receive an input indicating a selection of the first UI or the second UI;
- when the first UI regarding the progress of the schedule is selected, display content associated with the schedule based on the category of the event;
- when the second UI regarding the adjustment of the schedule is selected, display content associated with adjusting the schedule based on the category of the event; and
- transmit, information regarding the adjusted schedule to another device corresponding to a participant related to the adjusted schedule in response to identifying that the schedule is adjusted.

* * * * *